(12) United States Patent
Jeong et al.

(10) Patent No.: US 9,977,490 B2
(45) Date of Patent: May 22, 2018

(54) DUAL MODE INPUT APPARATUS, ELECTRONIC APPARATUS HAVING THE SAME, AND CONTROL METHOD THEREOF

(71) Applicant: SAMSUNG ELECTRONICS CO., LTD., Suwon-si (KR)

(72) Inventors: Hee-yeon Jeong, Seoul (KR); Sung-hwan Kim, Suwon-si (KR); Raina Park, Suwon-si (KR); Su-in Lee, Seongnam-si (KR); Duck-jin Choi, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 241 days.

(21) Appl. No.: 14/937,177

(22) Filed: Nov. 10, 2015

(65) Prior Publication Data
US 2016/0334863 A1 Nov. 17, 2016

(30) Foreign Application Priority Data

May 13, 2015 (KR) ........................ 10-2015-0066854

(51) Int. Cl.
*G06F 3/0354* (2013.01)
*G06F 3/00* (2006.01)
(Continued)

(52) U.S. Cl.
CPC ................ *G06F 3/002* (2013.01); *B43K 1/01* (2013.01); *B43K 23/08* (2013.01); *B43K 29/00* (2013.01); *G06F 3/03542* (2013.01); *G06F 3/03545* (2013.01); *G06F 3/0412* (2013.01); *G06F 2203/04106* (2013.01)

(58) Field of Classification Search
CPC .... G06F 3/003; G06F 3/03542; G06F 3/0412; G06F 3/03545; G06F 2203/04106; G06F 3/033–3/0395; B43K 29/00; B43K 23/08; B43K 1/01
See application file for complete search history.

(56) References Cited

U.S. PATENT DOCUMENTS

2004/0085286 A1* 5/2004 Wang .................. G06F 3/03545
345/156
2008/0030486 A1 2/2008 Cook
(Continued)

FOREIGN PATENT DOCUMENTS

WO 2015/013200 A2 1/2015

OTHER PUBLICATIONS

International Search Report and Written Opinion dated Mar. 18, 2016 in corresponding International Patent Application No. PCT/KR2015/013486.

*Primary Examiner* — Larry Lee
(74) *Attorney, Agent, or Firm* — Staas & Halsey LLP

(57) ABSTRACT

An input apparatus, an electronic apparatus having the same, and a control method thereof are provided. The input apparatus includes a body, a first input unit provided in first end of the body and configured to input information to a first medium, and a second input unit detachably coupled to one of the first input unit and a second end of the body and configured to provide information input to a second medium. An input mode of the input apparatus is selectively set to one of the first input unit and the second input unit according to a coupling position of the second input unit.

25 Claims, 33 Drawing Sheets

(51) Int. Cl.
  *B43K 29/00* (2006.01)
  *B43K 23/08* (2006.01)
  *B43K 1/01* (2006.01)
  *G06F 3/041* (2006.01)

(56) References Cited

U.S. PATENT DOCUMENTS

| | | | |
|---|---|---|---|
| 2013/0249870 A1* | 9/2013 | Slaby | G06F 3/044 345/179 |
| 2014/0035887 A1 | 2/2014 | Kim | |
| 2014/0050516 A1 | 2/2014 | Lazaridis et al. | |
| 2017/0090605 A1* | 3/2017 | Horie | G06F 3/03545 |

* cited by examiner

300

400

DUAL MODE INPUT APPARATUS, ELECTRONIC APPARATUS HAVING THE SAME, AND CONTROL METHOD THEREOF

CROSS-REFERENCE TO RELATED APPLICATIONS

This application claims priority from Korean Patent Application No. 10-2015-0066854, filed on May 13, 2015, in the Korean Intellectual Property Office, the disclosure of which is incorporated herein by reference in its entirety.

BACKGROUND

1. Field

Apparatuses and methods consistent with exemplary embodiments relate to an input apparatus, an electronic apparatus having the same, and a control method thereof, and more particularly, to an input apparatus including a plurality of input modes, an electronic apparatus having the same, and a control method thereof.

2. Description of the Related Art

In recent years, electronic apparatuses which store contents written on paper with a pen using an ultrasonic sensor and an infrared sensor provided in an input apparatus to confirm the contents written on the paper have been proposed.

The electronic apparatuses have trouble in use in that the user needs to have a separate input apparatus which includes an ultrasonic sensor and an infrared sensor, and a receiver which receives a signal transmitted from the ultrasonic sensor or the infrared sensor.

The contents separately received by the receiver are stored in the receiver and have to be transmitted to an electric apparatus including a display to be separately confirmed, and thus contents written in real time may not be confirmed.

In recent years, a receiver which is coupled to an electronic apparatus including a display and is capable of confirming contents written in real time have been proposed. However, the user still has trouble in use in that the user is required to separately have the input apparatus and the receiver.

SUMMARY

Exemplary embodiments may overcome the above disadvantages and other disadvantages not described above. Also, an exemplary embodiment is not required to overcome the disadvantages described above, and an exemplary embodiment may not overcome any of the problems described above.

One or more exemplary embodiments relate to an input apparatus capable of directly inputting information to a display apparatus and transmitting information written on paper to the display apparatus including in real time, an electronic apparatus including the same, and a control method thereof.

One or more exemplary embodiments relate to an input apparatus capable of easily converting an input mode to a display apparatus and paper, an electronic apparatus including the same, and a control method thereof.

One or more exemplary embodiments relate to an input apparatus capable of protecting an unused input part thereof, an electronic apparatus including the same, and a control method thereof.

One or more exemplary embodiments relate to an input apparatus with easy use which is capable of inputting information to a display apparatus or paper using an input apparatus provided to an electronic apparatus without separate connection apparatus and input apparatus and confirming the information input to the paper through the display apparatus in real time, an electronic apparatus including the same, and a control method thereof.

According to an aspect of an exemplary embodiment, there is provided an input apparatus including a body, a first input unit provided to a first end of the body and configured to input information to a first medium, and a second input unit detachably coupled to one of the first input unit and a second end of the body and configured to input information to a second medium. An input mode which uses one of the first input unit and the second input unit may be selectively set according to a coupling position of the second input unit.

The second input unit may be coupled to the second end of the body in a first input mode which implements the input information to the first medium, and the second input unit may be coupled to the first input unit in the second input mode which implements the input information to the second medium.

The first input unit may include a writing member including an indication medium configured to indicate the input information to the first medium and formed to protrude from the one end of the body, and at least one transmitting sensor disposed adjacent to the writing member and configured to generate a signal to transmit the input information of the first medium to an electronic apparatus.

The transmitting sensor may include at least one of an ultrasonic transmitting sensor and an infrared transmitting sensor.

A switch configured to selectively activate the at least one transmitting sensor may be provided to the second end of the body, and the at least one transmitting sensor may generate the signal while the input mode is set to the second input unit.

The indication medium may include ink or graphite.

The input apparatus may further include at least one sub input unit detachably coupled to one of the first input unit and the second input unit, and the at least one sub input unit may include a writing member configured to have an indication medium to indicate the input information to the first medium.

Writing members are provided and a plurality of sub input units may include indication mediums having different colors.

While a plurality of sub input units being provided, the plurality of sub input units may be selectively detachably coupled to each other.

The second input unit may input information to the second medium where input is performed in an electromagnetic resonance manner.

The first medium is paper, and the second medium is a touch screen.

The second input unit may include a writing member including an indication medium configured to indicate the information input to the second medium. The first input unit may include at least one transmitting sensor configured to generate a signal to transmit the information input to the second medium to an electronic apparatus according to coupling of the second input unit to the first input unit.

A switch configured to selectively activate the at least one transmitting sensor provided to the first end of the body, and the at least one transmitting sensor may generate the signal while the input mode is set to the first input unit.

The input apparatus may further include at least one sub input unit selectively detachably coupled to the first input unit and the second input unit, and the at least one sub input unit may include a writing member configured of an indication medium configured to indicate information input to the second medium where input is performed.

Writing members of sub input units may include indication mediums having different colors.

In response to a plurality of sub input units being provided, the plurality of sub input units may be selectively detachably coupled to each other.

According to an aspect of an exemplary embodiment, there is provided an electronic apparatus including a display apparatus including at least one receiving sensor and a touch screen, and an input apparatus which is detachably coupled to the display apparatus and includes a body, a first input unit provided in a first end of the body and configured to input information to a medium, and a second input unit configured to input information to the touch screen. The first input unit may transmit a signal to the at least one receiving sensor, and the second input unit may transmit a signal to the touch screen. A first input mode which uses the first input unit and a second input mode which uses the second input unit may be selectively set according to a coupling position of the second input unit.

The second input unit may be coupled to the second end of the body for the first input mode which inputs the information to the medium, and the second input unit may be coupled to the first input unit in the second input mode which inputs the information to the touch screen.

The at least one receiving sensor may be provided to a side of the display apparatus.

The display apparatus may further include a fixing part configured to fix the medium to a side of the display apparatus.

According to an aspect of an exemplary embodiment, there is provided a method of controlling an electronic apparatus, the method including setting an input mode to one of using a first input unit of the input apparatus and a second input unit of the input apparatus inputting information to one of a medium and a touch screen using the input apparatus, and displaying one of the input information of the medium and the touch screen. In the setting of the input mode, the input mode may be set according to coupling of the second input unit to the second end of a body of the input apparatus, and the second input mode may be set according to coupling of the second input unit to the first input unit.

While the coupling of the second input unit is to the first input unit, the inputting of the information may include inputting the information to the touch screen through the second input unit, and while the coupling of the second input unit is to the second end of a body of the input apparatus, the inputting of the information may include inputting the information to the medium through the first input unit.

The method may further include, while the second input unit is coupled to second end of the body, fixing the medium to the electronic apparatus between the setting of the input mode and the inputting of the information, and transmitting the input information of the medium to the electronic apparatus in real time between the inputting of the information and the displaying.

The method may further include: setting a writing region in the medium where input is performed through the input apparatus between the fixing and the inputting of the information; and adjusting the transmitted information to a size corresponding to the touch screen between the inputting of the information and the displaying.

The method may further include, in response to the first input mode being set, coupling the second input unit to the first input unit after the displaying.

Additional aspects and advantages of the exemplary embodiments are set forth in the detailed description, and will be obvious from the detailed description, or may be learned by practicing the exemplary embodiments.

BRIEF DESCRIPTION OF THE DRAWINGS

The above and/or other aspects will be more apparent by describing in detail exemplary embodiments, with reference to the accompanying drawings, in which:

FIGS. 4 and 5 are diagrams illustrating an input apparatus according to a first exemplary embodiment, wherein FIG. 4 illustrates a use state of a writing member and FIG. 5 illustrates a non-use state of the writing member;

FIGS. 14 and 15 are diagrams illustrating an input apparatus of an electronic apparatus according to a second exemplary embodiment, wherein FIG. 14 illustrates a use state of a writing member and FIG. 15 illustrates a non-use state of the writing member;

FIGS. 21 and 22 are diagrams illustrating an input apparatus of an electronic apparatus according to a third exemplary embodiment, wherein FIG. 21 illustrates a use state of a writing member and FIG. 22 illustrates a non-use state of the writing member;

DETAILED DESCRIPTION

Figure 1:
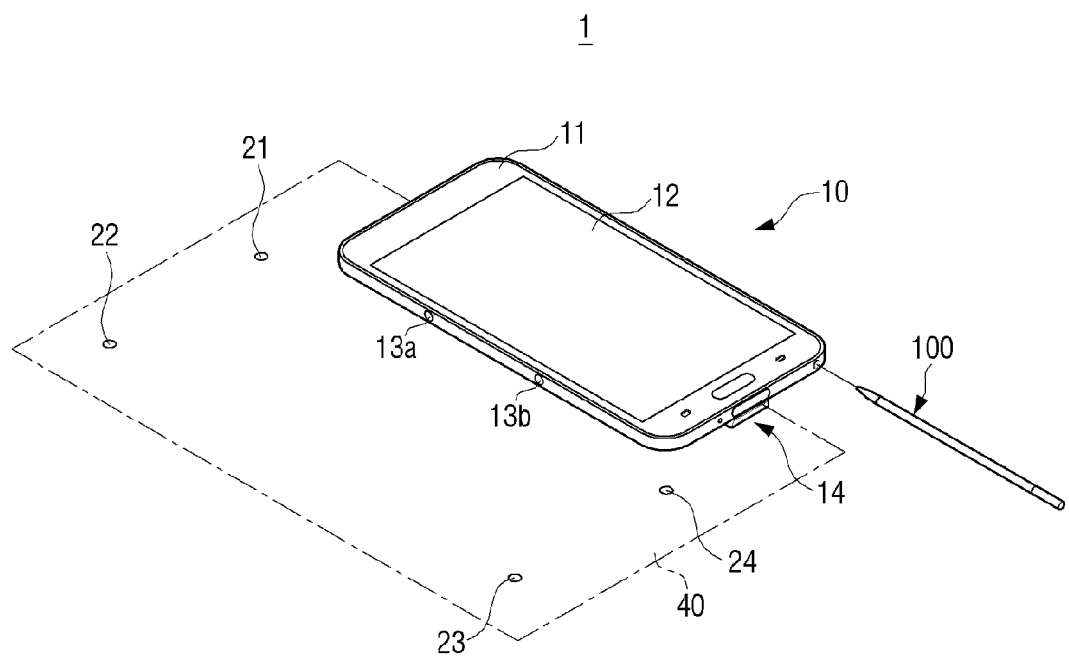
FIG. 1 is a perspective view illustrating an electronic apparatus according to a first exemplary embodiment.

Hereinafter, the exemplary embodiments are described in greater detail with reference to the accompanying drawings.

In the following description, unless otherwise described, the same reference numerals are used for the same elements when they are depicted in different drawings. The matters defined in the description, such as detailed construction and elements, are provided to assist in a comprehensive understanding of the exemplary embodiments. Thus, it is understood that the exemplary embodiments can be carried out without those specifically defined matters. Also, functions or elements known in the related art are not described in detail since they would obscure the exemplary embodiments with unnecessary detail.

Referring to FIG. 1, an electronic apparatus 1 according to a first exemplary embodiment may include a display apparatus 10 and an input apparatus 100.

The display apparatus 10 may be an apparatus capable of exchanging information with the user, and may include a housing 11, a touch screen 12, first receiving sensors 13a and 13b, and a controller 15.

The housing 11 may form an outer appearance of the display apparatus 10, and the housing 11 may include electric/electronic sub assemblies (ESAs) and a battery for driving of the display apparatus 10 in an inside thereof. The housing 11 may be formed of synthetic resin such as plastic, but the housing 11 may be formed of a metal material according to preference of the user.

The housing 11 may further include a fixing part 14 which fixes (or attaches) a first medium where input is performed 40 to an outer side thereof. For example, the first medium where input is performed 40 may include a recording medium capable of recording certain contents such as paper.

The fixing part 14 may include an insertion groove (see 14a of FIG. 2) configured to fix the first medium where input is performed 40 so that the posture (or position) of the first medium where input is performed 40 fixed to the display apparatus 10 may not be changed in response to information being input by the user to the first medium where input is performed 40 through the first input unit 110 of the input apparatus 100 to be described later. While FIG. 1 is illustrated with a particular type of an electronic apparatus, the present invention is not limited thereto and the electronic apparatus may be a mobile phone, a tablet, a computer, a wearable and portable devices, etc., and any other electronic device capable of processing input thereto.

Figure 2:
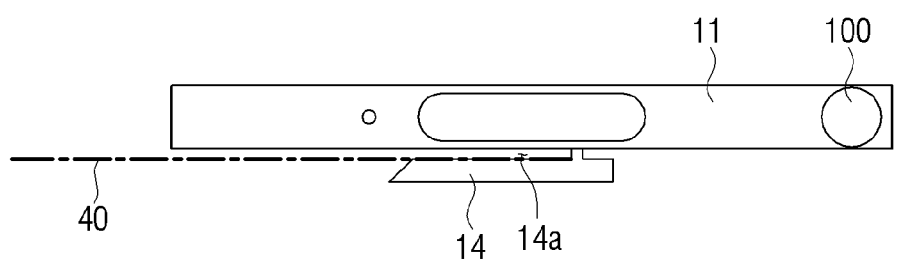
FIG. 2 is a plan view illustrating the electronic apparatus illustrated in FIG. 1.

For example, referring to FIG. 2, the user may fix the first medium where input is performed 40 by inserting the first medium where input is performed 40 into the insertion groove 14a of the fixing part 14. In this example, the insertion groove 14a may be formed to have a size sufficient to fix one first medium where input is performed 40. The fixing part 14 may be formed of a material having certain elasticity to contain a plurality of pieces of paper. The exemplary embodiment has illustrated that the fixing part 14 is formed in a rear of the display apparatus 10. However, for example, a certain slot (not shown) may be formed along a side of the housing 11 in which the first receiving sensors 13a and 13b to be described later are arranged, and the first medium where input is performed 40 may be fixed to the slot.

Figure 3:
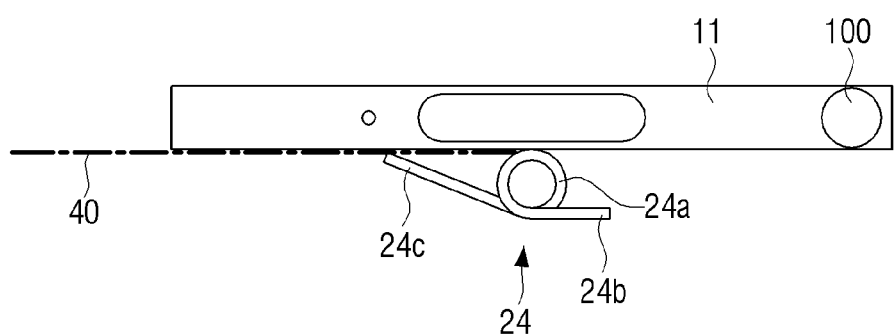
FIG. 3 is a plan view illustrating a modified example of a fixing part illustrated in FIG. 1.

A modified example of the fixing part 14 will be described with reference to FIG. 3. A fixing part 24 illustrated in FIG. 3 may include a torsion portion 24a, a push portion 24b, and a pressing portion 24c. For example, the user may press the push portion 24b toward the housing 11 so that the pressing portion 24c may be lifted up to a direction away from the housing 11. Then, the user may insert the first medium where input is performed 40 between the housing 11 and the pressing portion 24c, and release force applied to the push portion 24b. Accordingly, the pressing portion 24c may press the first-input medium 40 toward the housing 11 by the force of the torsion portion 24a and fix the first medium where input is performed 40.

The touch screen 12 may provide a graphic user interface (GUI) to the user, and thus the user may exchange information with the display apparatus 10. The touch screen 12 may be provided to a front of the housing 11.

The touch screen 12 may include a second receiving sensor (not shown) to input information to the display apparatus 10 through touch of the user to the touch screen 12 using a finger or the input apparatus 100. The second receiving sensor may include at least one among a capacitive touch sensor, a resistive touch sensor, an optical touch sensor, and an electromagnetic touch sensor.

At least one first receiving sensor 13a and 13b may be provided to one side of the display apparatus 10, and may receive a signal transmitted from the first input unit 110 of the input apparatus 100. The first receiving sensors 13a and 13b may be provided to correspond to transmitting sensors 112a and 112b of the first input unit 110. For example, when the transmitting sensors 112a and 112b include an ultrasonic transmitting sensor 112a, the first receiving sensors 13a and 13b may include an ultrasonic receiving sensor 13a. When the transmitting sensors 112a and 112b include an infrared transmitting sensor 112b, the first receiving sensors 13a and 13b may include an infrared receiving sensor 13b. When the transmitting sensors 112a and 112b include both the ultrasonic transmitting sensor 112a and the infrared transmitting sensor 112b, the first receiving sensors 13a and 13b may include both the ultrasonic receiving sensor 13a and the infrared receiving sensor 13b. Two first receiving sensors 13a and 13b may be provided as illustrated in FIG. 1, but one first receiving sensor or three or more first receiving sensors may be provided.

The controller 15 may analyze signals received from the first receiving sensors 13a and 13b, and control the display apparatus 10 to display the analyzed signals to the user through the touch screen 12.

Figure 4:
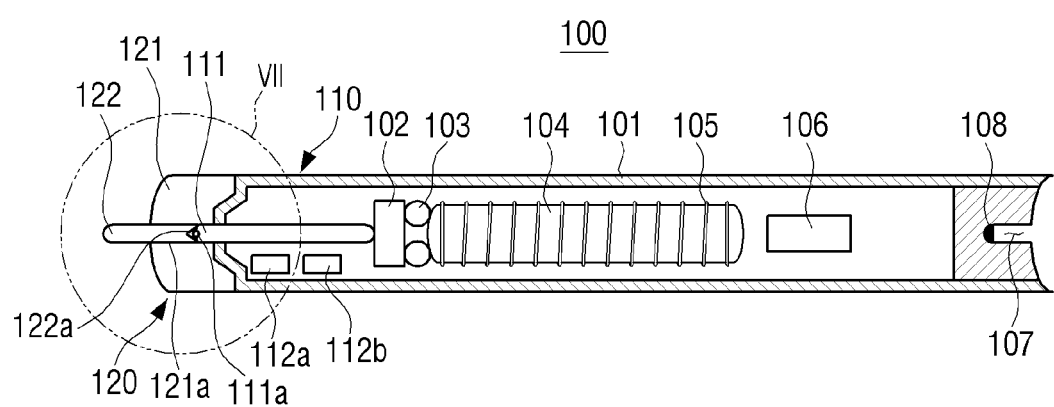
Figure 5:
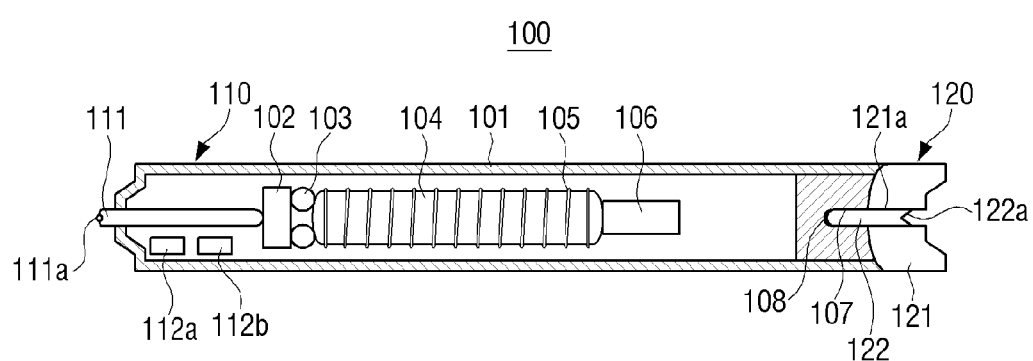

The input apparatus 100 according to a first exemplary embodiment will be described with reference to FIGS. 4 and 5. The input apparatus 100 according to the first exemplary embodiment may include a body 101, a first input unit 110, and a second input unit 120 to input information to the touch screen 12 of the display apparatus 10 and the first medium where input is performed 40.

The body 101 may form an outer appearance of the input apparatus 100, and the body 101 may be formed of the same material as the housing 11 of the display apparatus 10 to provide unity. For example, when the housing 11 is formed of synthetic resin such as plastic, the body 101 may also be formed of the synthetic resin such plastic. When the housing 11 is formed of a metal material, the body 101 may also be formed of the metal material. The body 101 may have a general pen-like shape to provide good grip to the user. While the body 101 is described as having a pen-like shape, the present invention is not limited thereto and the body 101 may be in any shape (form) configured to be used to input information and/or command.

The body 101 may include a ferrite chip 102, an O-ring 103, a ferrite core 104, and a coil 105 in an inside thereof so as to input information through touch of the touch screen 12 in the display apparatus 10 and detect writing pressure applied to the input apparatus 100.

For example, in response to the touch screen 12 being touched by the user through the second input unit 120 of the input apparatus 100, a tip 122 of the second input unit 120 may be in contact with the touch screen 12 and may move to a certain length toward the ferrite chip 102. Accordingly, a writing member 111 of the first input unit 110 may move toward the ferrite chip 102 to a certain length, and the ferrite chip 102 may move to be close to the ferrite core 104. In this example, the ferrite core 104 may be fixed to a circuit board and the like provided to the inside of the body 101, and the O-ring 103 is formed of an elastic body, and may be maintained in a pressed state between the ferrite chip 102 and the ferrite core 104. As the ferrite chip 102 is close to the ferrite core 104, the inductance of the coil 105 may be increased, and thus frequency generated in a circuit disposed in the inside of the body 101 may be changed. The change in the frequency may be detected through the second receiving sensor (not shown) included in the touch screen 12, and thus the user may input information to the touch screen 12 through the touch by the input apparatus 100.

Through detection of a change amount in the inductance of the coil 105, the writing pressure may be measured by detecting force applied to the touch screen 12 or the first medium where input is performed 40 through the input apparatus 100 by the user. Accordingly, a line being input to the touch screen 12 or the first medium where input is performed 40 through the input apparatus 100, the line may be input in a different thickness.

The touch and writing pressure detection using the ferrite chip 102, the O-ring 103, the ferrite core 104, and the coil 105 are known, and thus detailed description thereof will be omitted.

A battery 106 for driving the input apparatus 100 may be included in the inside of the main body 101. The battery 106 may be a rechargeable battery capable of charging the input apparatus 100 in a coupled state to the display apparatus 10 or a disposable battery.

A coupling groove 107 to which the second input unit 120 to be described later is detachably coupled may be provided to the other end of the body 101. For example, information being input to the first medium where input is performed 40 through the input apparatus 100 by the user, the second input unit 120 may be separated from the first input unit 110, and unit 120 may be fixed to the other end of the body 101 so that the tip 122 is coupled to the coupling groove 107. In this example, the second input unit 120 and the body 101 may be coupled through snap-coupling or through rotation coupling by screw threads formed in the input unit 120 and the body 101. However, the coupling method between the second input unit 120 and the body 101 is not limited thereto, and any method of detachably coupling the second input unit 130 to the other end of the body 101 may be used.

A switch 108 configured to activate the transmitting sensors 112a and 112b to be described later may be provided to the inside of the coupling groove 107, and the switch 108 may be turned on/off according to the detachment/attachment of the tip 122 from/to the coupling groove 107. The switch 108 may be electrically coupled to the transmitting sensors 112a and 112b. The switch 108 may be a tactile switch of which the on/off state may be controlled according to pressing or a switch using an optical sensor. When the transmitting sensors 112a and 112b are not used, the powers of the transmitting sensors 112a and 112b may be turned off, and signal overlapping between a signal generated in the first input unit 110 and a signal generated in the second input unit 120 may be removed.

The first input unit 110 may be formed in one end of the body 101, and the first input unit 110 may include a writing member 111 and the transmitting sensors 112a and 112b to input information to the first medium where input is performed 40.

The writing member 111 may be provided to the first input unit 110 so that one end thereof may protrude from the one end of the body 101 to a certain length, and the other end thereof may be in contact with the ferrite chip 102. The writing member 111 may include an indication medium such as ink or graphite to indicate the information input to the first medium where input is performed 40. Accordingly, the writing member 111 may be a general ball pen lead or a pencil lead. The writing member 111 may be detachably coupled to the one end of the body 101 to replace the indication medium such as ink or graphite in response to the indication medium being exhausted. To detect the writing pressure or input information to the touch screen 12 through the second input unit 120, the writing member 111 may be slidably coupled to press the ferrite chip 102 at a certain interval to a longitudinal direction of the input apparatus 100.

The transmitting sensors 112a and 112b may transmit certain signals so as to transmit information for contents input to the first medium where input is performed 40 through the writing member 111 to the display apparatus 10. For example, in response to characters being input to the first medium where input is performed 40 through the writing member 111 by the user, the transmitting sensors 112a and 112b may transmit coordinate data for a moving path of the writing member 111, and the first receiving sensors 13a and 13b of the display apparatus 10 may receive the coordinate data, convert the received coordinate data to electrical signals, and transfer the converted electrical signals to the controller 15. The controller 15 may display the electrical signals to the touch screen 12. Since the transmitting sensors 112a and 112b have to transmit the data for the moving path of the writing member 111 to the display apparatus 10 as described above, the transmitting sensors 112a and 112b may be disposed close to the writing member 111.

The transmitting sensors 112a and 112b may transmit writing pressure data applied to the first medium where input is performed 40 through the input apparatus 100 by the user as described above in addition to the data for the moving path of the writing member 111.

The transmitting sensors 112a and 112b may include at least one of the ultrasonic transmitting sensor 112a and the infrared transmitting sensor 112b to perform the above-described functions. The exemplary embodiment has illustrated that the input apparatus 100 includes two transmitting sensors 112a and 112b, but this is not limited thereto. For example, one transmitting sensor may be provided to the input apparatus 100 to perform all the above-described functions. In another example, three or more transmitting sensors may be included in the input apparatus 100 to accurately transmit information. Two transmitting sensors may be included in the input apparatus 100 in consideration of product cost and receiving sensitivity.

Figure 6:
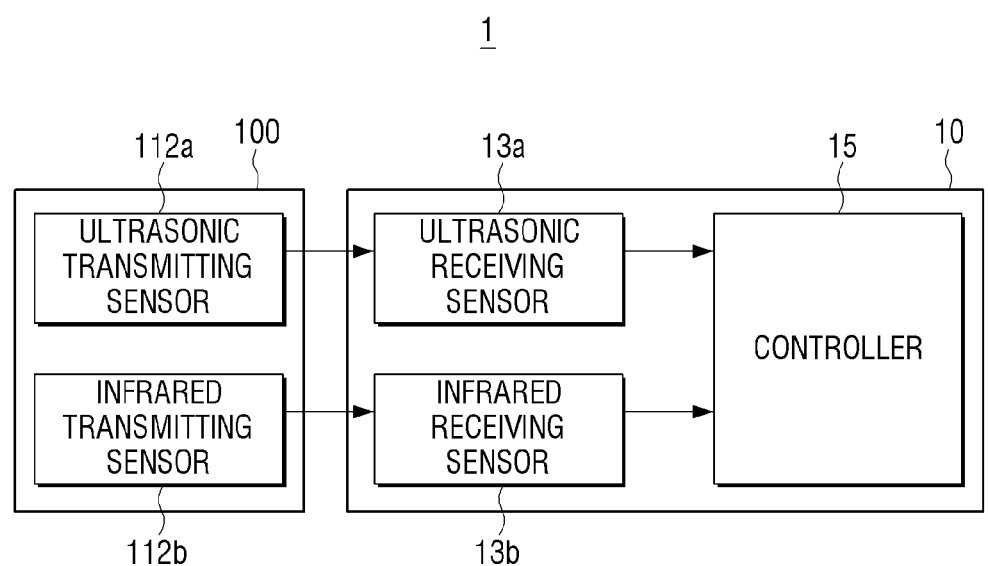
FIG. 6 is a schematic block diagram illustrating a transmitting sensor, a receiving sensor, and a controller of the electronic apparatus illustrated in FIG. 1.

That is, referring to FIG. 6, in the electronic apparatus 1 according to the first exemplary embodiment, the transmitting sensors 112a and 112b included in the input apparatus 100 may include at least one of the ultrasonic transmitting sensor 112a and the infrared transmitting sensor 112b, and the first receiving sensors 13a and 13b included in the display apparatus 10 may include at least one of the ultrasonic receiving sensor 13a and the infrared receiving sensor 13b corresponding to the transmitting sensors 112a and 112b. Through the configuration, the input apparatus 100 may transmit the information for contents input through the input apparatus 100 to the display apparatus 10.

The second input unit 120 may be detachably coupled to the one end of the first input unit 110, and may include a cap part 121 and the tip 122 so as to input information to the touch screen 12 of the display apparatus 10. The second input unit 120 may be coupled to the one end of the first input unit 110 through snap-coupling or rotation coupling by screw threads formed in the second input unit 120 and the body 101. However, the coupling structure is not limited thereto, and any method of detachably coupling the second input unit 120 to the one end of the first input unit 110 may be used.

The cap part 121 may form an outer appearance of the second input unit 120, and the cap part 121 may be formed so that the tip 122 may be provided to the end thereof to protrude by a certain length, and the other end thereof may correspond to the one end of the first input unit 110 to be detachably coupled to the first input unit 110. For example, a receiving groove 122a for receiving the writing member 111 of the first input unit 110 may be provided to the other end of the cap part 121. To input information to the touch screen 12 through the second input unit 120, the user may couple second input unit 120 and the first input unit 110 so that the writing member 111 of the first input unit 110 is received in the receiving groove 122a of the second input unit 120. Since the tip 122 has to be moved to a direction of the ferrite chip 102 to a certain length so as to detect the writing pressure and input the information to the touch screen 12, a hole 121a for the tip to which the tip 122 may be slidably coupled may be formed in an inside of the cap part 121.

One end of the tip 122 may protrude to a certain length from one end of the cap part 121, and the other end thereof may be in contact with the writing member 111 of the first input unit 110. For detection of the writing pressure or information input to the touch screen 12, the tip 122 may be slidably coupled to the hole 121a for a tip of the cap part 121 to a certain interval along the longitudinal direction of the input apparatus 100 so as to press the ferrite chip 102 through the writing member 111.

Figure 7:
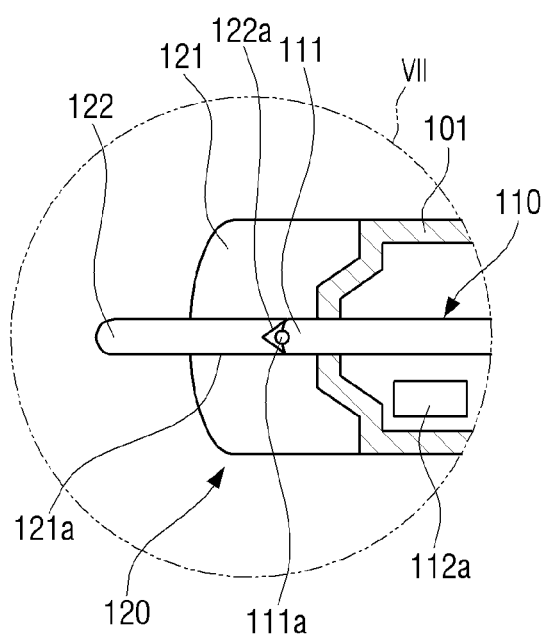
FIG. 7 is an enlarged diagram illustrating a VII portion illustrated in FIG. 4.

Referring to FIG. 7, a receiving groove 122a may be provided to serve as a damage prevention groove and may be formed in the other end of the tip 122 so as to prevent a contact part 111a disposed in one end of the writing member 111 from being damaged. That is, in response to information being input by touching of the touch screen 12 through the second input unit 120 in a state in which the second input unit 120 is coupled to the first input unit 110, the other end of the tip 122 including the receiving groove 122a provided to serve as a damage prevention groove may prevent the contact part 111a of the writing member 111 from being damage due to direct contact with the other end of the tip 122, and the other end of the tip 122 may cause the writing member 111 to move to a predetermined length toward the ferrite chip 102 and to press the ferrite chip 102. A separate protection member (not shown) which may protect the contact part 111a of the writing member 111 may be further included in the receiving groove 122a provided to serve as a damage prevention groove.

Figure 8:
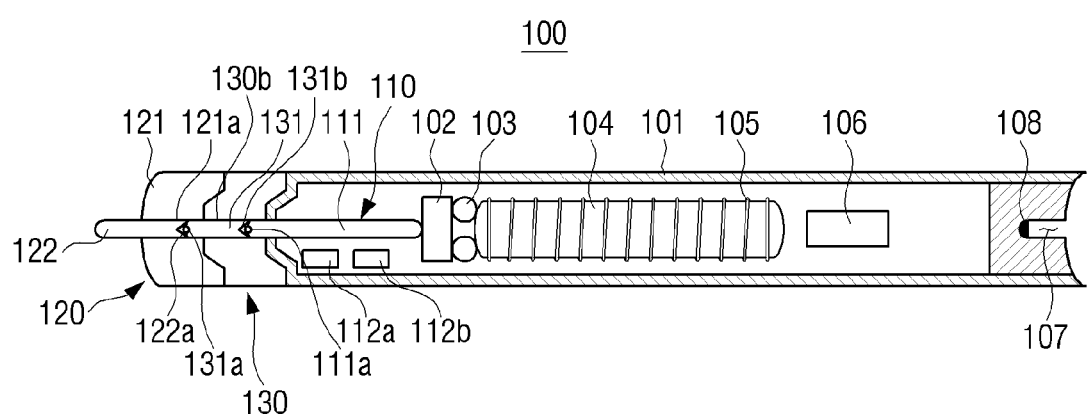
FIGS. 8, 9 and 10 are diagrams illustrating modified examples of the input apparatus illustrated in FIG. 4, wherein a sub input unit is coupled to a first input unit and a second input unit.
Figure 9:
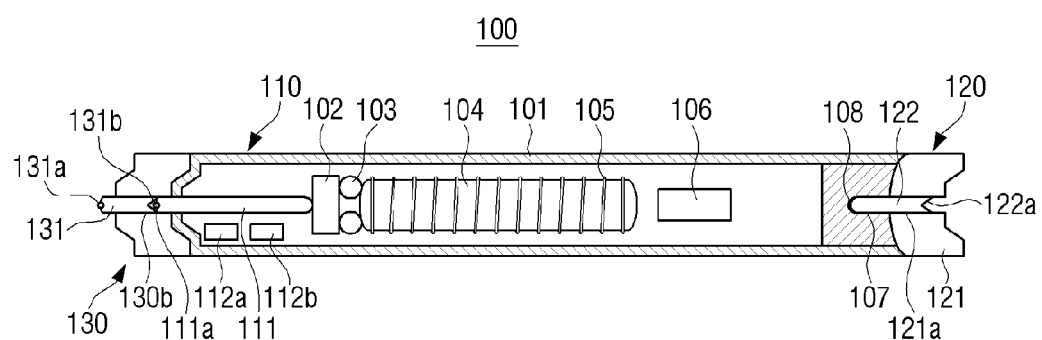
Figure 10:
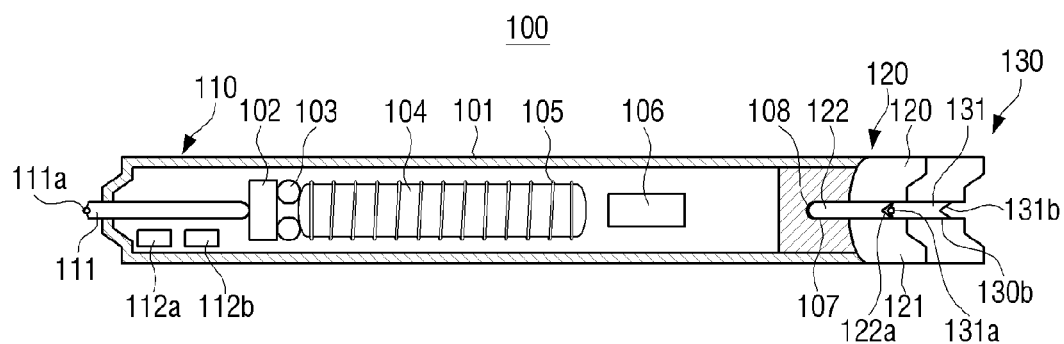

Referring to FIGS. 8 to 10, the input apparatus 100 of the electronic apparatus 1 according to the first exemplary embodiment may further include at least one sub input unit 130 which is selectively detachably coupled to the first input unit 110 and the second input unit 120, and is configured of an indication medium for indicating the information input to the first medium where input is performed 40.

The input apparatus 100 including one sub input unit 130 will be described in detail with reference to FIGS. 8 to 10. However, as described above, a plurality of sub input units 130 may be provided. One end of the sub input unit 130 may be coupled to the first input unit 110 so that the writing member 111 provided to protrude from the one end of the body 101 may be coupled to a writing member 131 of the sub input unit 130. The other end of the sub input unit 130 may be coupled to the second input unit 120 so that the writing member 131 provided to protrude from the other end of the sub input unit 130 may be coupled to the tip 122 of the second input unit 120.

The writing member 131 of the sub input unit 130 may include an indication medium such as ink or graphite so as to indicate information input to the first medium where input is performed 40. However, the writing member 131 of the sub input unit 130 may have a different color or thickness from the writing member 111 of the first input unit 110. In response to information being input to the first medium where input is performed by the user, the sub input unit 130 may be selectively coupled to the first input unit 110 and the second input unit 120, and thus writing members 111 and 131 having various colors or thicknesses may be used.

The writing member 131 of the sub input unit 130 may be separatably coupled to a receiving groove 130b of the sub input unit 130 to replace the writing member 131 of the sub input unit 130 in response to the indication medium such as ink or graphite being exhausted. The writing member 131 of the sub input unit 130 may be slidably coupled to the receiving groove 130b, and thus pressing pressure applied to the tip 122 may be transferred to the wiring member 111 of the first input unit 110.

A tip 131a formed in one end of the writing member 131 of the sub input unit 130 is inserted to the receiving groove 122a of the second input unit 120 which may be provided to serve as an damage prevention groove and thus the damage of the tip 131a may be prevented. A damage prevention groove 131b may be formed in the other end of the writing member 131 to prevent the tip 111a of the writing member 111 of the first input unit 110 from being damaged.

A plurality of sub input units 130 may be provided. The plurality of sub input units 130 may be provided to be consecutively detachably coupled between the first input unit 110 and the second input unit 120 in a first input mode. In a second input mode, the user may store the plurality of sub input units by coupling sub input units 130 desired to be used to the first input unit 110, and by coupling sub input units undesired to be used to the second input unit 120 coupled to the other end of the body 101.

Figure 11:
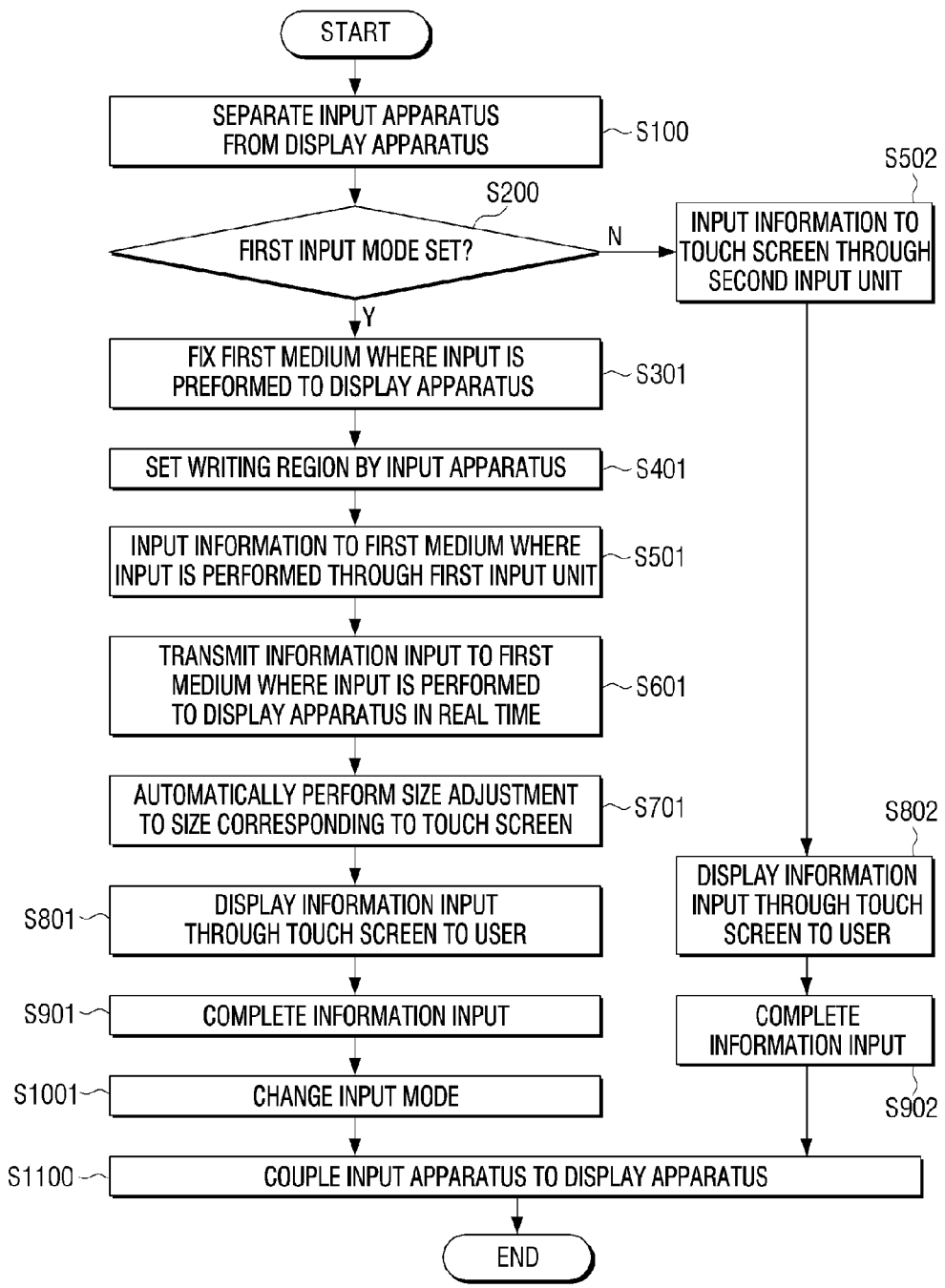
FIG. 11 is a flowchart illustrating an operation of an electronic apparatus according to exemplary embodiments.

Hereinafter, the operation of the electronic apparatus 1 having the above-described configuration according to the first exemplary embodiment will be described in detail with reference to FIGS. 11 to 13.

In general, the user may input information to the display apparatus 10 by touching the touch screen 12 of the display apparatus 10 according to the first exemplary embodiment using a finger or an input apparatus 100 provided to the electronic apparatus 1.

The user may separate the input apparatus 100 from the display apparatus 10 (S100). The electronic apparatus 1 may provide a writing input screen to the user through the touch screen 12 by automatically executing a writing input application according to the separation of the input apparatus 100 from the display apparatus 10.

Then, the user may set an input mode of the input apparatus 100 (S200).

Figure 12:
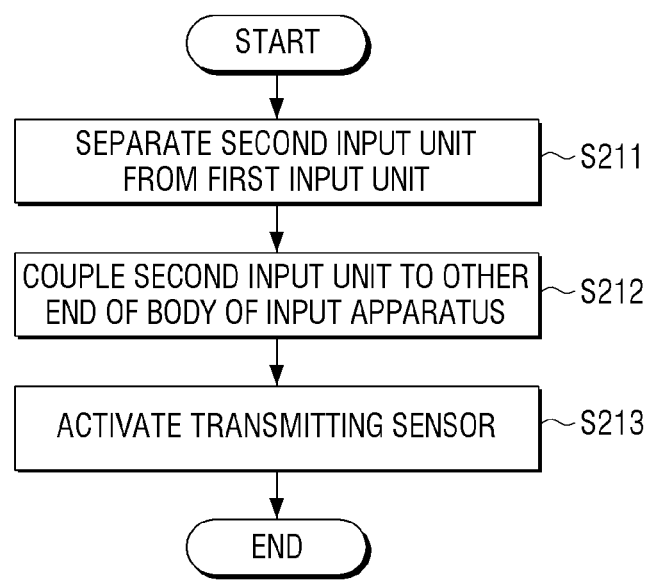
FIG. 12 is a flowchart illustrating a method of setting an input mode in operation S200 of FIG. 11 in the input apparatus according to the first exemplary embodiment in detail.

For example, referring to FIG. 12, in response to certain contents being recorded in a recording medium such as paper through a writing material such as a ball pen by the user, that is, in response to details being recorded by the user in listing to a lecture or attending a meeting, the user may set the first input mode which inputs information to the first medium where input is performed 40 through the first input unit 110.

In the setting of the first input mode, the user may separate the second input unit 120 from the first input unit 110 (S211). The user may couple the second input unit 120 to the other end of the body 101 of the input apparatus 100 (S212). The tip 122 of the second input unit 120 may be inserted into the coupling groove 107 formed in the other end of the body 101, and may press the switch 108 to activate the transmitting sensors 112a and 112b (S213). The input apparatus 100 may transmit a signal to the display apparatus 10 according to the activation of the transmitting sensors 112a and 112b.

The user may fix the first medium where input is performed 40 to the fixing part 14 and 24 of the display apparatus 10 (S301). For example, the first medium where input is performed 40 may be fixed to a horizontal direction as illustrated in FIG. 1. In another example, although not shown in drawings, the first medium where input is performed 40 may be fixed to a vertical direction.

In response to the fixing of the first medium where input is performed 40 being completed, the user may set a writing region using the input apparatus 100 (S401).

For example, referring to FIG. 1, the user may set the writable region by designating four points 21 to 24 (21, 22, 23 and 24) onto the first medium where input is performed 40 using the input apparatus 100. The information for the four points 21 to 24 may be transmitted to the controller 15 via the first receiver 13a, 13b. The controller 15 may record a moving path of the input apparatus 100 by converting the received signal to coordinate values for reference values using the four points 21 to 24 as the reference values, and provide the converted coordinate values for the reference values to the user.

The first input unit 110 in the input apparatus 100 of which the input mode is changed may be exposed to the outside, and the user may input certain information to the first medium where input is performed 40 through the first input unit 110 (S501). For example, the information input to the first medium where input is performed 40 through the writing member 111 of the first input unit 110 may be written and recorded in the medium where input is performed 40 for the confirmation of the user. In this example, in response to the sub input unit 130 being provided, the user may selectively couple the first input unit 110 and the second input unit 120, and input the information with various colors or thicknesses.

The information recorded in the first medium where input is performed 40 may be transmitted to the display apparatus 10 in real time through the transmitting sensors 112a and 112b of the input apparatus 100 (S601). The information transmitted to the display apparatus 10 may be received in the first receiving sensor 13a, 13b, and the first receiving sensor 13a, 13b may convert the received information to an electrical signal, and transfer the converted electrical signal to the controller 15.

The first controller 15 may receive the information recorded in the first medium where input is performed 40 and perform size adjustment on the received information to a size corresponding to the touch screen 12 (S701). That is, the controller 15 may automatically adjust the size of the recorded information in consideration of a ratio of the set writing region and the ratio of the touch screen 12. The size-adjusted information may be displayed to the user through the touch screen 12 (S801).

In response to the information input being completed (S901), the user may change the input mode of the input apparatus 100 to the second input mode again (S1001).

Figure 13:
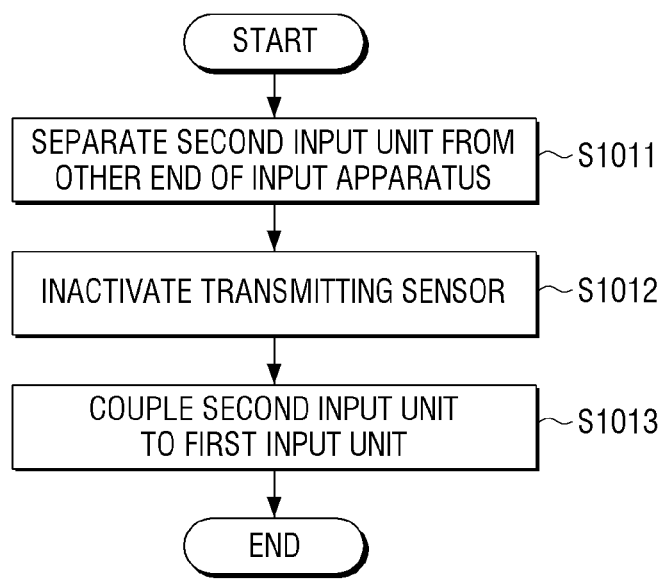
FIG. 13 is a flowchart illustrating a method of changing an input mode in operation S1001 of FIG. 11 in the input apparatus according to the first exemplary embodiment in detail.

For example, referring to FIG. 13, the user may separate the second input unit 120 from the other end of the input apparatus 100 (S1011). The transmitting sensors 112a and 112b of the input apparatus 100 may be inactivated (S1012). The user may couple the second input unit 120 to the first input unit 110 (S1013). After the user changes the input mode of the input apparatus 100 to the second input mode, the user may couple the input apparatus 100 to the display apparatus 10 (S1100).

The user may separate the first medium where input is performed 40 to which the information is input from the display apparatus 10, and the user may separately keep the first medium where input is performed.

In operation S200, in response to the second input mode for inputting information to the touch screen 12 of the display apparatus 10 using the second input unit 120 of the input apparatus 100 being set by the user, the user may input the information to the touch screen 12 intactly using the input apparatus 100 separated from the display apparatus 10 (S502). The input information may be displayed to the user through the touch screen 12 (S802). In response to the information input being completed (S902), the user may couple the input apparatus 100 to the display apparatus 10 (S1100).

The user may input the information to the touch screen 12 only using a finger in the state in which the input apparatus 100 is coupled to the display apparatus 10.

Accordingly, the electronic apparatus 1 according to the first exemplary embodiment may record information through the writing of the information to the first medium where input is performed 40, and provide the recorded information to the user through the touch screen 12 of the display apparatus 10 in real time.

The electronic apparatus 1 according to the first exemplary embodiment may not need a separate connection device for executing the above-described operations, and may provide convenience in use only through carrying of the electronic apparatus 1 including the input apparatus 100.

The process of changing two modes provided to the input apparatus 100 according to the medium where input is performed may be simple, and the transmitting sensors 112a and 112b may be turned on/off without mutual effect between the input modes. Accordingly, the electronic apparatus may provide the information to the user through the touch screen 12 by accurately reflecting the information desired to be input by the user.

In response to the input units 110 and 120 being not used, the input units 110 and 120 may be hidden and protected from the outside, and endurance of the electronic apparatus may be improved.

An electronic apparatus 1 according to a second exemplary embodiment will be described with reference to FIGS. 14 and 15. A display apparatus 10 of the electronic apparatus 1 in the second exemplary embodiment is the same as the display apparatus 10 of the electronic apparatus 1 in the first exemplary embodiment. Therefore, the same reference numerals as the components of the display apparatus 10 in the first exemplary embodiment are designated to components of the display apparatus 10 in the second exemplary embodiment, and thus detailed description of the display apparatus 10 will be omitted. Only a first input unit 140 and a second input unit 150 of an input apparatus 200 which are different from the first input unit 110 and the second input unit 120 in the first exemplary embodiment will be described in detail.

Figure 14:
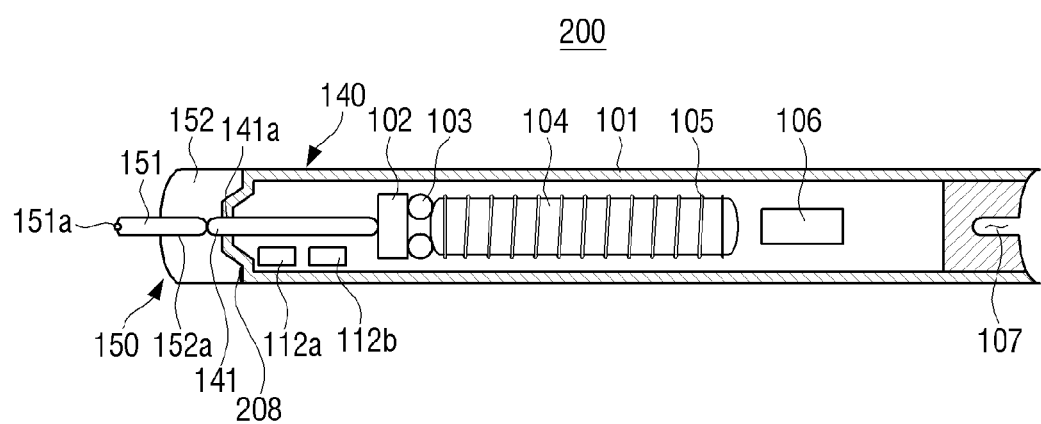
Figure 15:
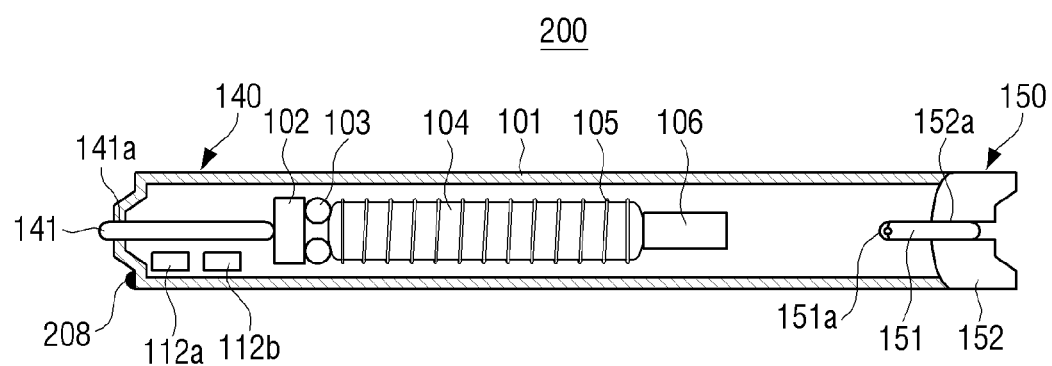

Referring to FIGS. 14 and 15, the first input unit 140 of the input apparatus 200 according to the second exemplary embodiment may include a tip 141 which may input information to the touch screen 12 other than the writing member 111 unlike the first input unit 110 of the first exemplary embodiment. The second input unit 140 may include transmitting sensors 112a and 112b like the first input unit 110 of the first exemplary embodiment. The user may input the information to the touch screen 12 using the first input unit 140.

The tip 141 may be provided to be slidably inserted into a receiving groove 141a and to be slidably moved to a certain interval to a longitudinal direction of the input apparatus 200. The tip 141 may press a ferrite chip 102.

The second input unit 150 may include a writing member 151 which include an indication medium for inputting information to the medium where input is performed 40 such as paper unlike the second input unit 120 of the first exemplary embodiment. The writing member 151 may be a ball pen lead or a pencil lean like the first exemplary embodiment. The writing member 151 may be provided to be slidably inserted into a receiving groove 152a of a cap part 152 and to be slidably moved to a certain interval so as to detect writing pressure applied to the writing member 151.

The input apparatus 200 according to the second exemplary embodiment may include a switch 208 in one end of the first input unit 140 to which the second input unit 150 is coupled. For example, the switch 208 may be a tactile switch which is pressed to activate the transmitting sensors 112a and 112b according to the coupling of the second input unit 150 to the first input unit 140. In another example, the switch 208 may be a switch using an optical sensor. The switch 208 may be electrically coupled to the transmitting sensors 112a and 112b.

Figure 16:
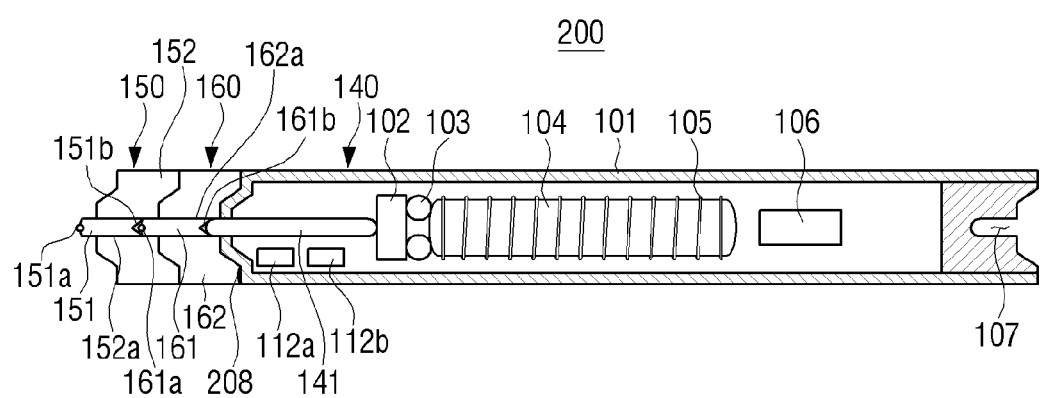
FIGS. 16, 17 and 18 are diagrams illustrating modified examples of the input apparatus illustrated in FIG. 14, wherein a sub input unit is coupled to a first input unit and a second input unit.
Figure 17:
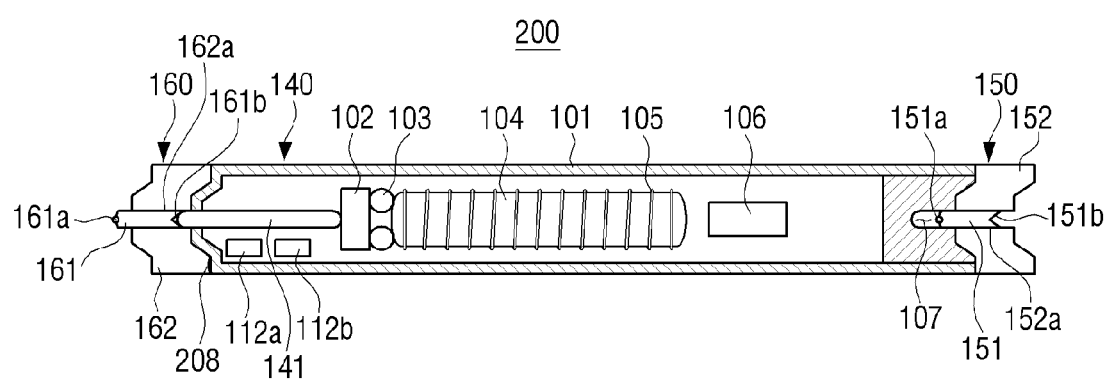
Figure 18:
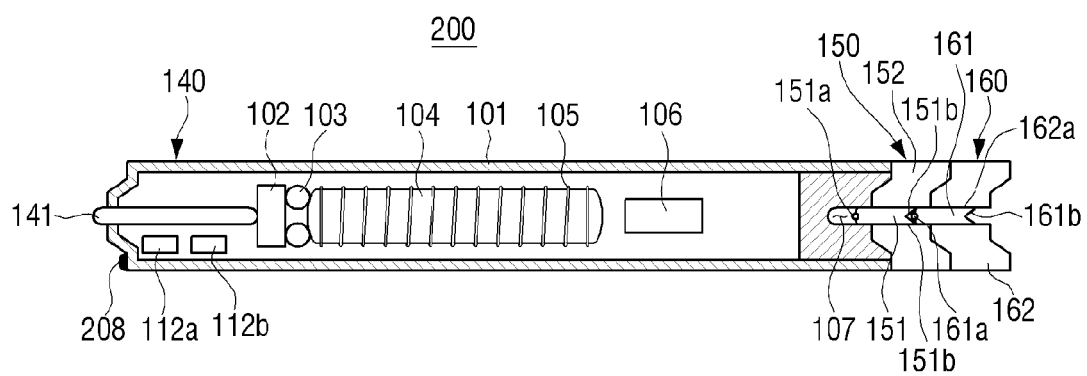

Referring to FIGS. 16 to 18, the input apparatus 200 of the electronic apparatus 1 according to the second exemplary embodiment may further include at least one sub input unit 160 which may be selectively detachably coupled to the first input unit 140 and the second input unit 150 and include a writing member 161 configured of an indication medium for indicating information to the medium where input is performed 40 such as paper.

An example in which one sub input unit 160 is provided to the input apparatus 200 will be described in detail with reference to FIGS. 16 to 18. In another example, a plurality of sub input units 160 may be provided as described above. One end of the sub input unit 160 may be coupled to the first input unit 140 so that the tip 141 provided to protrude from one end of a body 101 may be coupled to the writing member 161 of the sub input unit 160. The other end of the sub input unit 160 may be coupled to the second input unit 150 so that the writing member 161 provided to protrude from the other end of the sub input unit 160 is coupled to the writing member 151 of the second input unit 150.

The writing member 161 of the sub input unit 160 may include an indication medium for indicating information input to the medium where input is performed 40 such as ink or graphite. The writing member 161 of the sub input unit 160 may have different color or thickness from the writing member 151 of the second input unit 150. In response to the information being input to the medium where input is performed 40 by the user, the user may use the writing members 151 and 161 having various colors or thicknesses through the selective coupling of the sub input unit 160 to the first input unit 140 and the second input unit 150. The writing member 161 may be provided to be inserted into a receiving groove 162a of a cap part 162.

The writing member 161 of the sub input unit 160 may be separately coupled to a receiving groove 162a of the sub input unit 160 to replace the indication medium such as ink or graphite in response to the indicating medium being exhausted in the writing member 161. The writing member 161 of the sub input unit 160 may be slidably coupled to the receiving groove 162a, and the writing pressure applied to the writing member 151 of the second input unit 150 may be transferred to the tip 141 of the first input unit 140.

Since a tip 161a formed in one end of the writing member 161 of the sub input unit 160 may be inserted into a damage prevention groove 151b of the second input unit 150, the damage of the tip 161a may be prevented. Since a damage prevention groove 161b may be formed in the other end of the writing member 161, in response to the tip 141 of the first input unit 140 or the tip 151a of the second input unit 150 being coupled to the sub input unit 160, the damage of the tips 141 or 151a may be prevented.

A plurality of sub input units 160 may be provided. In the first input mode, the plurality of sub input units may be coupled to the other end of the input apparatus 200 together with the second input unit 150. In the second input mode, an input unit desired to be used by the user among the second input unit 150 and the plurality of sub input units 160 may be selectively coupled to the first input unit 140 to be used, and an input units undesired to be used by the user may be coupled to the other end of the input apparatus 200 to be kept.

Hereinafter, an operation of the electronic apparatus 1 having the above-described configuration according to the second exemplary embodiment will be described with reference to FIGS. 11, 19, and 20. Among operations illustrated in FIG. 11, operations S200 and S1001 performed through the electronic apparatus 1 of the second exemplary embodiment which are different from those performed through the electronic apparatus 1 of the first exemplary embodiment will be described in detail. Operations S100, S301, S401, S501, S502, S601, S701, S801, S802, S901, S902, and S1100 performed through the electronic apparatus 1 of the second exemplary embodiment are the same as those performed through the electronic apparatus 1 of the first exemplary embodiment other than the first input mode and the second input mode in the second exemplary embodiment are inversely set to those in the first exemplary embodiment. That is, the electronic apparatus 1 according to the second exemplary embodiment may perform operation S502 in response to the first input mode being set in operation S200, and perform operation S301 in response to the second input mode being set in operation S200.

The user may separate the input apparatus 200 from the display apparatus 10 (S100). The user may set an input mode of the input apparatus 100 (S200).

Figure 19:
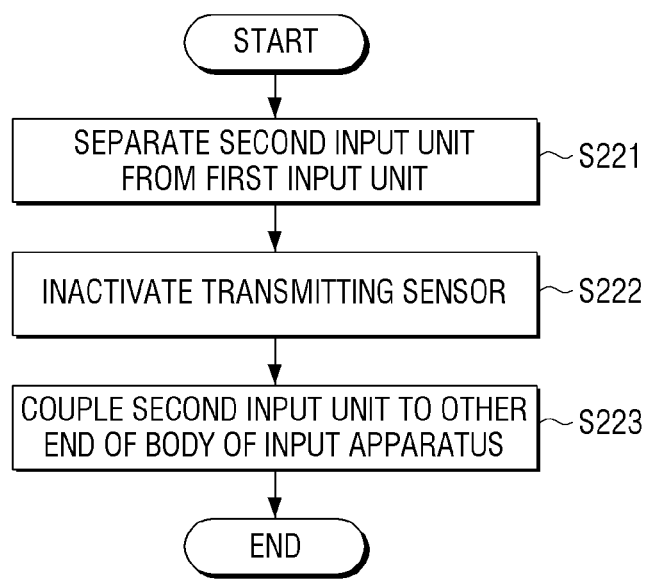
FIG. 19 is a flowchart illustrating a method of setting an input mode in operation S200 of FIG. 11 in the input apparatus according to the second exemplary embodiment in detail.

For example, referring to FIG. 19, the user may set the first input mode for inputting information to the touch screen 12 through the first input unit 140.

In this example, the user may separate the second input unit 150 from the first input unit 140 (S221). The pressure applied to the switch 208 may be released, and the transmitting sensors 112a and 112b may be inactivated (S222). The user may couple the second input unit 150 to the other end of the input apparatus 200 (S223).

The user may input information to the touch screen 12 through the first input unit 140 (S502). The information input to the touch screen 12 may be displayed to the user through the touch screen 12 (S802). In response to the information input being completed (S902), the user may further perform the process of coupling the second input unit 150 to the first input unit 140 again and then the user may couple the input apparatus 200 to the display apparatus 10 (S1100) or the user may input information to the medium where input is performed 40 through the second input unit 150.

Figure 20:
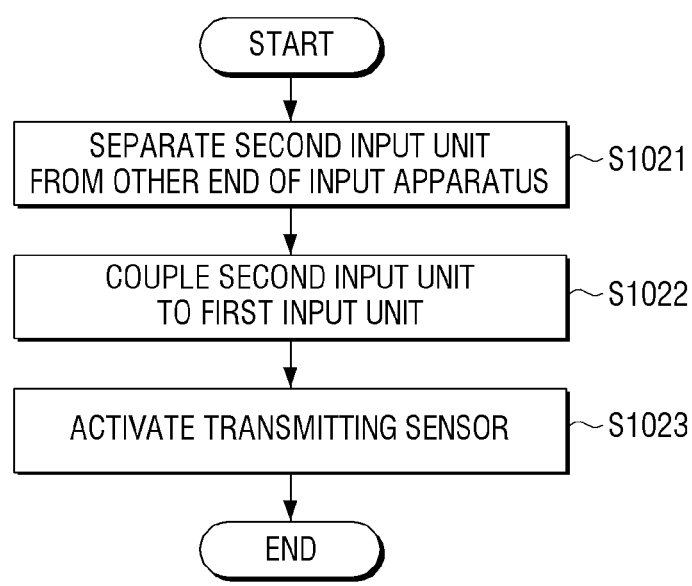
FIG. 20 is a flowchart illustrating a method of changing an input mode in operation S1001 of FIG. 11 in the input apparatus according to the second exemplary embodiment in detail.
Figure 21:
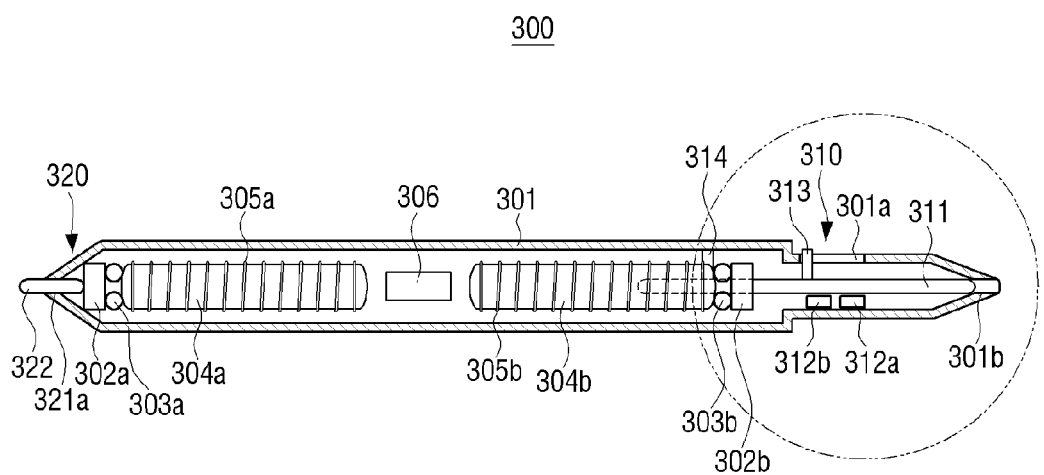
Figure 22:
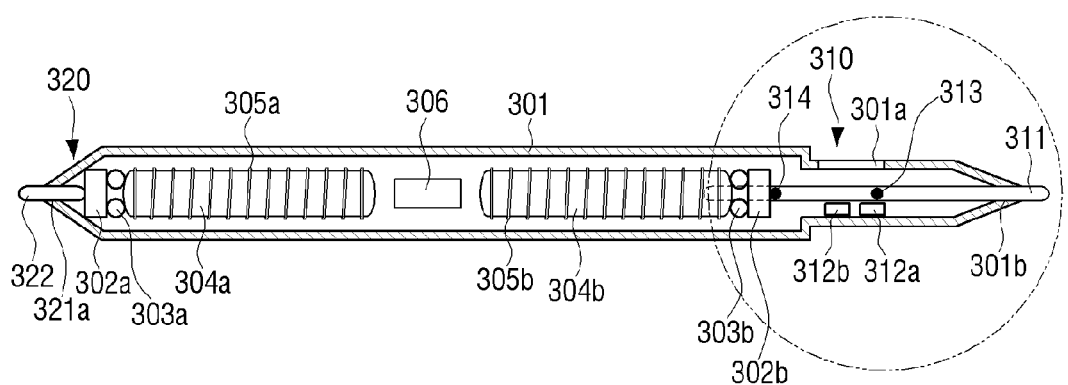

For example, referring to FIG. 20, the user may separate the second input unit 150 from the other end of the input apparatus 200 (S1021). In response to the second input unit 150 being coupled to the first input unit 140 (S1022), the switch 208 may be pressed and the transmitting sensors 112a and 112b may be activated (S1023). In this example, the user may couple the input apparatus 200 to the display apparatus 10 or the user may input information to the medium where input is performed 40 through the input apparatus 200.

In another example, in response to the second input mode being set in operation S200, the user may perform operations S301 and S401. The user may input information to the medium where input is performed 40 through the second input unit 150 (S501). Operations S601 to S901 may be performed. In the exemplary embodiment, operation S1001 may be omitted, and the user may immediately couple the input apparatus 200 to the display apparatus 10 (S1100).

In this example, in response to the sub input unit 160 being provided, the user may selectively couple the sub input unit 160 to the first input unit 140 and the second input unit 150, and input the information to the medium where input is performed 40 with various colors or thicknesses.

An electronic apparatus 1 according to a third exemplary embodiment will be described with reference to FIGS. 21 to 25. A display apparatus 10 of the electronic apparatus 1 in the third exemplary embodiment is the same as the display apparatus 10 of the electronic apparatus 1 in the first exemplary embodiment. Therefore, the same reference numerals as the components of the display apparatus 10 in the first exemplary embodiment are designated to components of the display apparatus 10 in the third exemplary embodiment, and thus detailed description of the display apparatus 10 will be omitted. Only an input apparatus 300 which is different from the input apparatus 100 of the first exemplary embodiment will be described in detail Referring to FIGS. 21 and 22, the input apparatus 300 according to the third exemplary embodiment may include a body 301, a first input unit 310, and a second input unit 320.

The body 301 of the input apparatus 300 according to the third exemplary embodiment is almost similar to the body 101 of the input apparatus 100 according to the first exemplary embodiment, but the body 301 of the input apparatus 300 may have a difference from the body 101 of the input apparatus 100 in that the first input unit 310 and the second input unit 320 may be provided to both ends of the input apparatus 300, and thus structures for the first and second input units 310 and 320 which detect writing pressure may be provided, respectively.

That is, in the input apparatus 300 according to the third exemplary embodiment, a ferrite chip 302a, an O-ring 303a, a ferrite core 304a, and a coil 305a for the first input unit 310 may be arranged in the inside of the body 301 adjacent to the first input unit 310, and a ferrite chip 302b, an O-ring 303b, a ferrite core 304b, and a coil 305b for the second input unit 320 may be arranged in the inside of the body 301 adjacent to the second input unit 320. The operations of the ferrite chips 302a and 302b, the O-rings 303a and 302b, the ferrite cores 304a and 304b, and the coils 305a and 305b are the same as those of the ferrite chip 102, the O-ring 103, the ferrite core 104, and the coil 105 in the first exemplary embodiment, and thus detailed description thereof will be omitted. However, only one battery 306 may be provided as in the input apparatus 100 of the first exemplary embodiment.

In the third exemplary embodiment, the first input unit 310 may be provided to the other end of the body 301, and the second input unit 320 may be provided to one end of the body 301. A guide groove 301a configured to guide a protrusion lever 313 formed to protrude from one side of a writing member 311 and a hole 301b for a writing member configured to withdraw a portion of the writing member 311 to the outside or to lead in the portion of the writing member 311 to an inside of the body 301 may be formed in the other end of the body 301 in which the first input unit 310 is provided. The guide groove 301a and the hole 301b for a writing member will be described in detail together with the protrusion lever 313 and the writing member 311.

The first input unit 310 may be formed in the other end of the body 301. The first input unit 310 may include the writing member 311 and transmitting sensors 312a and 312b so as to input information to the first medium where input is performed 40.

The writing member 311 may be slidably provided to the inside of the body 301 so that the writing member 311 may be withdrawn to a certain length from the other end of the body 301 through the hole 301b for a writing member formed in the body 301 or the writing member 311 may be lead in to the inside of the body 301 through the hole 301b for a writing member.

For withdrawal or lead-in of the writing member 311, the writing member 311 may include the protrusion lever 313 formed to protrude in a side thereof. The protrusion lever 313 may protrude toward the outside of the body 301 to a certain length through the guide groove 301a formed in the body 301. The user may withdraw the writing member 311 toward the outside of the body 301 or lead in the writing member 311 to the inside of the body 301 by manipulating the protruding portion of the protrusion lever 313 along the guide groove 301a.

The wiring member 311 may include a protrusion 314 formed to protrude in the side thereof. The protrusion 314 may not be exposed to the outside of the body 301 from the inside thereof. When the protrusion 314 is not exposed to the outside of the body and the writing member 311 is lead in to the inside of the body 301, the protrusion 314 may cause the writing member 311 and the ferrite chip 302b not to be coupled. In response to the writing member 311 being withdrawn toward the outside of the body 301, the protrusion 314 may couple the writing member 311 and the ferrite chip 302b so as to detect writing pressure of the writing member 311.

Figure 23:
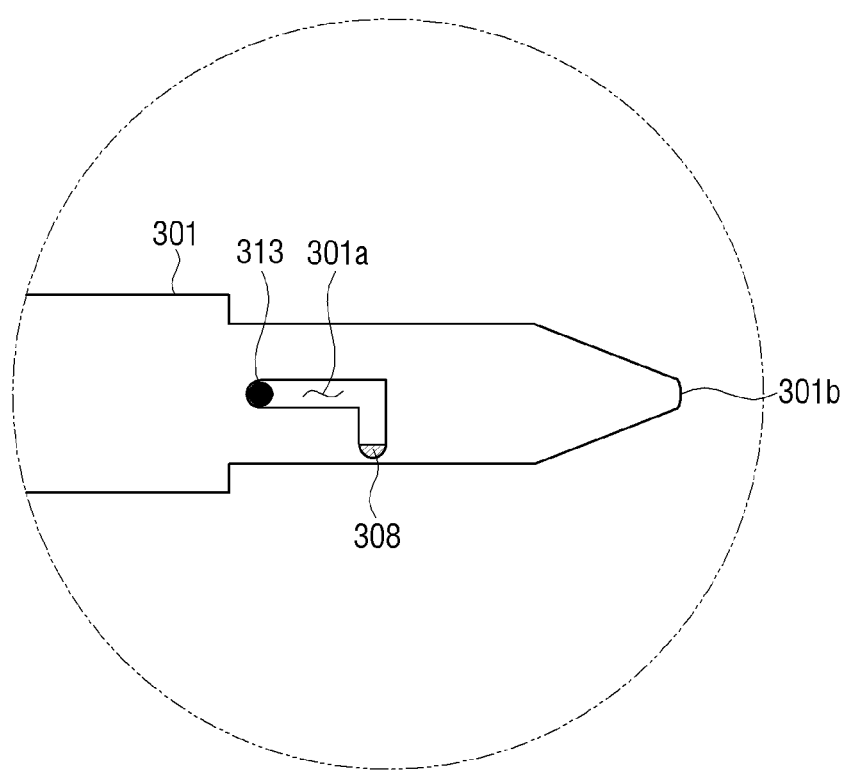
FIGS. 23, 24 and 25 are plan views illustrating an operation process of a first input unit illustrated in FIG. 21.
Figure 24:
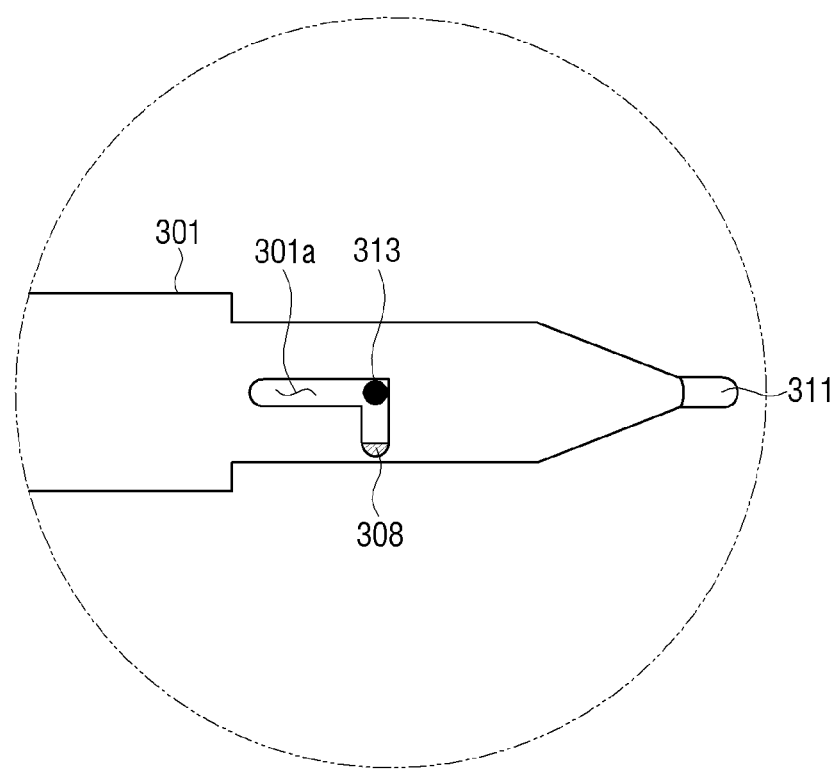
Figure 25:
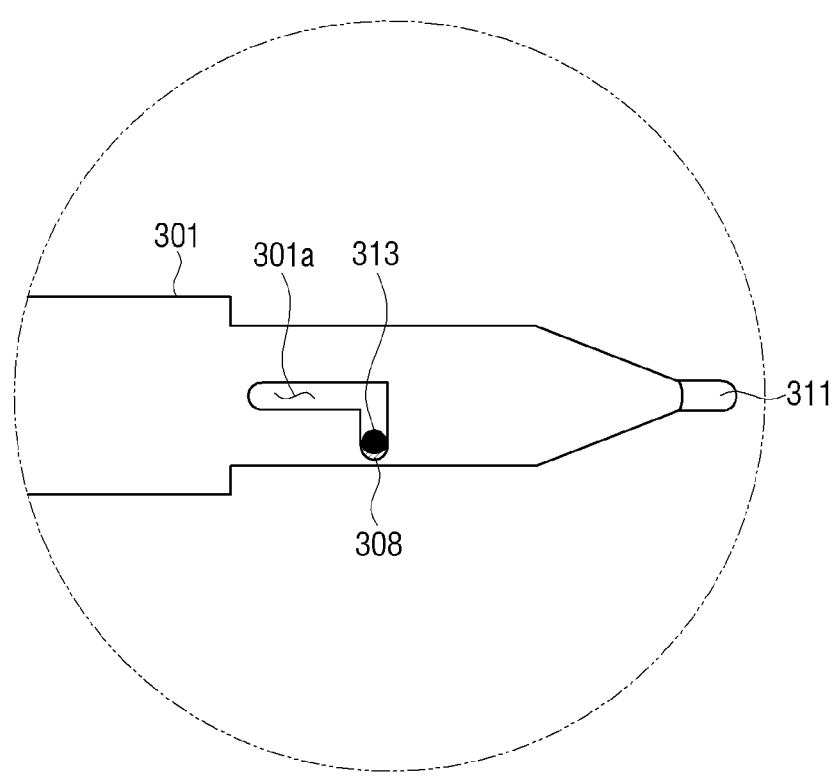

For example, referring to FIGS. 23 to 25, in response to the writing member 311 being lead in to the inside of the body 301, the protrusion lever 313 may be disposed in a first location as illustrated in FIG. 23. In this example, the protrusion 314 may be spaced from the ferrite chip 302b.

To use the first input unit 310, the user press the protrusion lever 313 along the guide groove 301a to the right side in FIG. 23 to withdraw the writing member 311 from the body 301. Accordingly, the protrusion lever 313 may be disposed in a second location as illustrated in FIG. 24. The writing member 311 may not be coupled to the ferrite chip 302b in the state in which the protrusion lever 313 is disposed in the second location, and the writing pressure of the writing member 311 may not be detected.

Accordingly, the user may move the protrusion lever 313 along the guide groove 301a so that the writing member 311 may be rotated on the basis of an axis in a longitudinal direction and the protrusion 314 formed in the side of the writing member 311 may be coupled to the ferrite chip 302a. Accordingly, the protrusion lever 313 may be disposed in a third location as illustrated in FIG. 25.

The protrusion lever 313 may press the switch 308 provided to the guide groove 301a to activate the transmitting sensors 312a and 312b through movement to the third location. A switch using an optical sensor may be used as the switch 308 as described above.

The writing member 311 may include an indication medium such as ink or graphite like the writing member 111 of the first exemplary embodiment. To replace the writing member 311 of the sub input unit 160 in response to the indication medium being exhausted, a portion of the other end of the body 301 may be formed to be opened in the input apparatus 300 according to the third exemplary embodiment. The user may replace the writing member 311 by opening the portion of the other end of the body 301.

Like the transmitting sensors 112a and 112b in the first exemplary embodiment, the transmitting sensors 312a and 312b may transmit a certain signal to transmit information for contents input to the first medium where input is performed 40 through the writing member 311 to the display apparatus 10. The transmitting sensors 312a and 312b are the same as the transmitting sensors 112a and 112b of the first exemplary embodiment, and thus detailed description thereof will be omitted.

The second input unit 320 may include a tip 322 which may be provided to protrude to a predetermined length from the one end of the body 301 and may input information to the touch screen of the display apparatus 10. Unlike the tip 122 of the first exemplary embodiment, one end of the tip 322 may protrude to the certain length from the body 301, but the other end of the tip 322 may be in direct contact with the ferrite chip 302a. To detect the writing pressure or input information to the touch screen 12 like the tip 122 of the first exemplary embodiment, the tip 322 of the third exemplary embodiment may be slidably coupled to a hole 321a for a tip to a predetermined interval to the longitudinal direction of the input apparatus 300 so as to press the ferrite chip 302a.

Hereinafter, an operation of the electronic apparatus 1 having the above-described configuration according to the third exemplary embodiment will be described with reference to FIGS. 11, 26, and 27. Among operations illustrated in FIG. 11, operations S200 and S1001 performed through the electronic apparatus 1 of the third exemplary embodiment which are different from those performed through the electronic apparatus 1 of the first exemplary embodiment will be described in detail. Operations S100, S301, S401, S501, S502, S601, S701, S801, S802, S901, S902, and S1100 performed through the electronic apparatus 1 of the third exemplary embodiment are the same as those performed through the electronic apparatus 1 of the first exemplary embodiment, and thus the operations will be shortly described.

The user may separate the input apparatus 300 from the display apparatus 10 (S100). The protrusion lever 313 of the input apparatus 300 separated from the display apparatus 10 may be disposed in the first location, and the wiring member 311 may be lead in to the inside of the body 301.

The user may set an input mode of the input apparatus 300 (S200).

Figure 26:
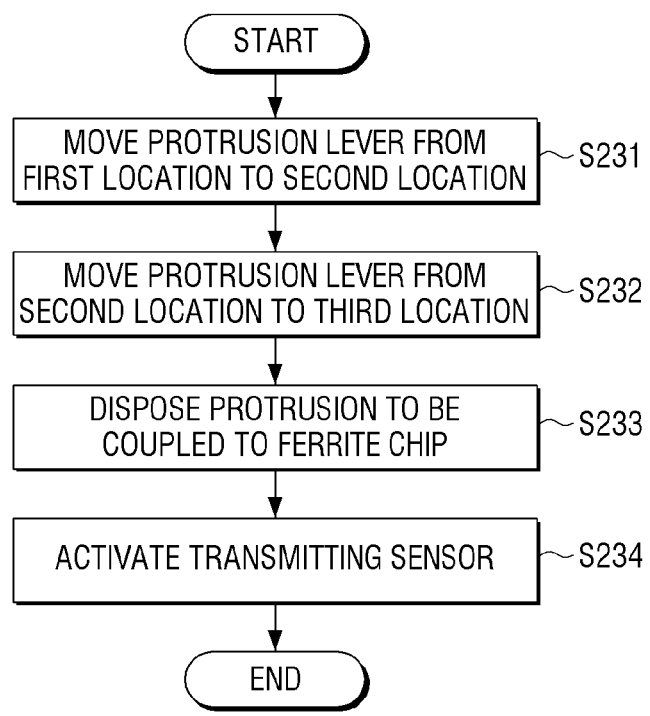
FIG. 26 is a flowchart illustrating a method of setting an input mode in operation S200 of FIG. 11 in the input apparatus according to the third exemplary embodiment in detail.

For example, referring to FIG. 26, the user may set the first input mode for inputting information to the first medium where input is performed 40 through the first input unit 310.

In this example, the user may move the protrusion lever 313 from the first location to the second location along the guide groove 301a (S231). The writing member 311 may be withdrawn to the certain length to the outside of the body 301. The user may move the protrusion lever 313 from the second location to the third location along the guide groove 301a so as to measure writing pressure applied to the writing member 311 in the process of inputting information to the first medium where input is performed 40 through the input apparatus 300 and to press the writing member 311 to an inner side direction of the body 301 again so that the writing member 311 may not be lead in again (S232). Accordingly, the protrusion 314 may be coupled to the ferrite chip 302b, and simultaneously the protrusion 314 may be supported by the ferrite chip 302a (S233). The protrusion lever 313 may press the switch 308 provided to the guide groove 301a through the movement to the third location to activate the transmitting sensors 312a and 312b (S324).

Operations S301 and S401 may be performed, and the user may input information to the first medium where input is performed 40 through the first input unit 310 (S501).

In response to operations S610 to S901 being performed, and the information input being completed, the user may change the input mode of the input apparatus 300 to the second input mode again (S1001).

Figure 27:
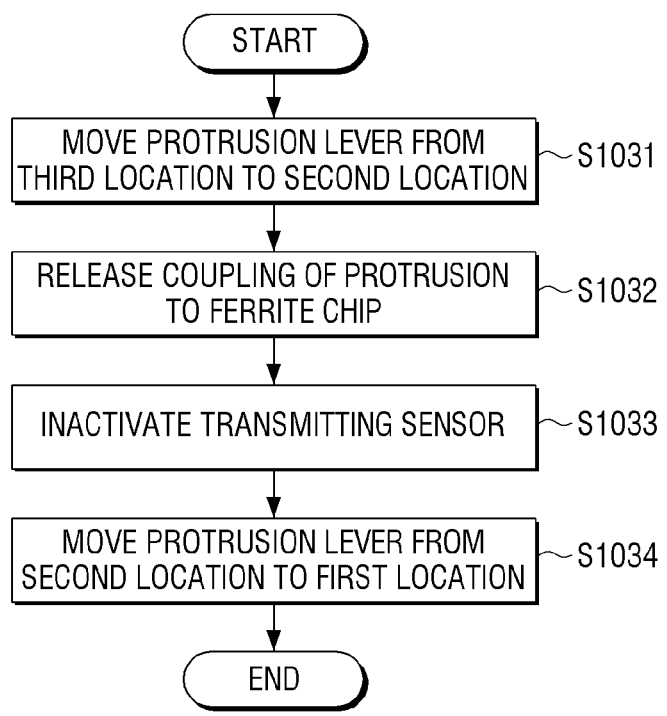
FIG. 27 is a flowchart illustrating a method of changing an input mode in operation S1001 of FIG. 11 in the input apparatus according to the third exemplary embodiment in detail.

For example, referring to FIG. 27, the user may move the protrusion lever 313 from the third location to the second location (S1031). The coupling of the protrusion 314 with the ferrite chip 302b may be released, the protrusion 314 may be spaced from the ferrite chip 302b (S1032). The pressing of the switch 308 by protrusion lever 313 may be released, and the transmitting sensors 312a and 312b may be inactivated (S1033). The user may move the protrusion lever 313 from the second location to the first location (S1034). Accordingly, the writing member 311 may be lead in to the inside of the body 301. That is, in response to the writing member 311 being not used, the writing member 311 may be protected from the outside, and thus endurance of the writing member 311 may be improved.

After the input mode of the input apparatus 300 is changed to the second input mode, the user may couple the input apparatus 300 to the display apparatus 100 (S1100).

In another example, in response to the second input mode which inputs information to the touch screen 12 of the display apparatus 10 using the second input unit 320 of the input apparatus 300 being set by the user, the user may input the information to the touch screen 12 intactly using the input apparatus 300 separated from the display apparatus 10 (S502). The input information may be displayed to the user through the touch screen 12 (S802). In response to the information input being completed (S902), the user may couple the input apparatus 300 to the display apparatus 10 (S1100).

An electronic apparatus 1 according to a fourth exemplary embodiment will be described with reference to FIG. 28. A display apparatus 10 of the electronic apparatus 1 in the fourth exemplary embodiment is the same as the display apparatus 10 of the electronic apparatus 1 in the first exemplary embodiment. Therefore, the same reference numerals as the components of the display apparatus 10 in the first exemplary embodiment are designated to components of the display apparatus 10 in the fourth exemplary embodiment, and detailed description of the display apparatus 10 will be omitted. Only an input apparatus 400 which is different from the input apparatus 100 of the first exemplary embodiment will be described in detail.

Figure 28:
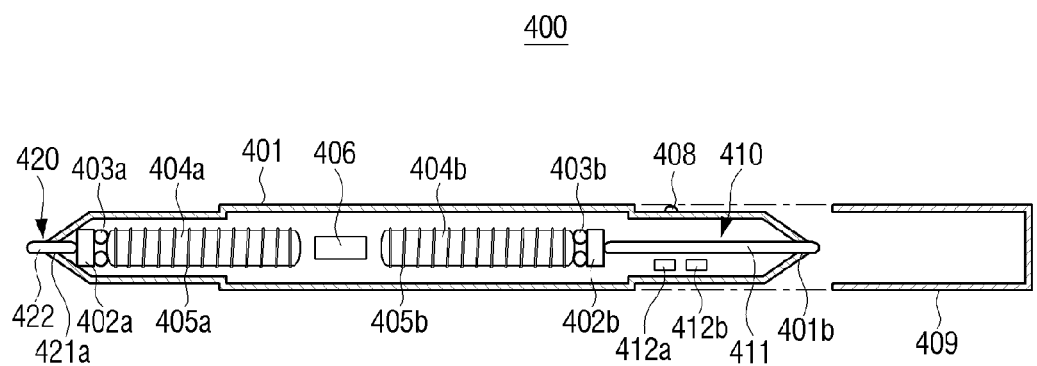
FIG. 28 is a cross-sectional view illustrating an input apparatus of an electronic apparatus according to a fourth exemplary embodiment.

Referring to FIG. 28, the input apparatus 400 according to the fourth exemplary embodiment may include a body 401, a first input unit 410, and a second input unit 420. The input apparatus 400 includes a ferrite core 404a and a coil 405a associated with a second input unit 420, a ferrite core 404b and a coil 405b associated with a first input unit 410, and a battery 406.

The body 401 of the input apparatus 400 according to the fourth exemplary embodiment is almost similar to the body 301 of the input apparatus 300 according to the third exemplary embodiment, For example, the body 401 of the input apparatus 400 may be the same as the body 301 of the input apparatus 300 in that the first input unit 410 and the second input unit 420 may be provided to both ends of the input apparatus 400, and thus structures for the first and second input units 410 and 420 which detect writing pressure may be provided, respectively. However, in the input apparatus 400 according to the fourth exemplary embodiment, the writing member 411 may not be selectively lead in to the inside of the body 401 or withdrawn from the inside of the body 401, and thus the configuration components such as the guide groove 301a for the protrusion lever 313 formed in the body 301 of the input apparatus 300 according to the third exemplary embodiment will be omitted.

However, the writing member 411 may be moved to a side of the ferrite chip 402b to a certain length so as to detect the writing pressure applied to the writing member 411, and thus a hole 401b for a writing member which causes the writing member 411 to be slidably moved may be formed.

The body 401 may further include an open/close cover 409 configured to selectively open and close the first input unit 410. The open/close cover 409 may be separatably coupled to the other end of the body 401. For example, the open/close cover 409 may be coupled to the other end of the body 401 in a snap manner or a screw manner.

A switch 408 configured to activate transmitting sensors 412a and 412b may be provided to a portion of the body 401 to which the open/close cover 409 is coupled. The switch 408 may inactivate the transmitting sensors 412a and 412b in response to the switch 408 being pressed according to the coupling of the open/close cover 409 to the body 401, and the switch 408 may activate the transmitting sensors 412a and 412b in response to the pressing of the switch 408 being released according to the separation of the open/close cover 409 from the body 401.

However, the switch 408 may be omitted, and so as to shield signals transmitted from the transmitting sensors 412a and 412b, the open/close cover 409 may be formed of a material capable of shielding the signals.

In response to information being input to the first medium where input is performed 40 through the first input unit 140, the open/close cover 409 may be separated from the other end of the body 401, and coupled to one end of the body 401, that is, a part of the body 401 in which the second input unit 420 is formed so as to be kept. A structure which causes the open/close cover 409 to be separately coupled to the body 401 may be formed in the one end of the body in which the second input unit 420 is formed.

The first input unit 410 may be formed in the other end of the body 401, and the first input unit 410 may include the writing member 411 and the transmitting sensors 412a and 412b to input information to the first medium where input is performed 40.

One end of the writing member 411 may be provided to protrude to a certain length to the outside of the body 401 through the hole 401b for a writing member formed in the body. The writing member 411 may be slidably coupled to the hole 401b for a writing member so as to detect the writing pressure applied to the writing member 411. The other end of the writing member 411 may be provided to be in contact with the ferrite chip 402b so as to detect the writing pressure applied to the writing member 411 in response to information being input to the first medium where input is performed 40 through the first input unit 410 by the user.

The writing member 411 may include an indication medium such as ink or graphite like the writing member 111 of the first exemplary embodiment. To replace the writing member 411 in response to the indication medium being exhausted, a portion of the other end of the body 401 may be formed to be opened in the input apparatus 400 according to the fourth exemplary embodiment like the input apparatus 300 of the third exemplary embodiment. The user may replace the writing member 411 by opening the portion of the other end of the body 401.

Like the transmitting sensors 112a and 112b in the first exemplary embodiment, the transmitting sensors 412a and 412b may transmit certain signals to transmit information for contents input to the first medium where input is performed 40 through the writing member 411 to the display apparatus 10. The transmitting sensors 412a and 412b are the same as the transmitting sensors 112a and 112b of the first exemplary embodiment, and thus detailed description thereof will be omitted.

The second input unit 420 may include a tip 422 which may be provided to protrude to a certain length from the one end of the body 401 and may input information to the touch screen 12 of the display apparatus 10. The tip 422 is the same as the tip 322 of the third exemplary embodiment, and thus detailed description thereof will be omitted.

Hereinafter, an operation of the electronic apparatus 1 having the above-described configuration according to the fourth exemplary embodiment will be described with reference to FIG. 11. Among operations illustrated in FIG. 11, operations S200 and S1001 performed through the electronic apparatus 1 of the fourth exemplary embodiment which are different from those performed through the electronic apparatus 1 of the first exemplary embodiment will be described in detail. Operations S100, S301, S401, S501, S502, S601, S701, S801, S802, S901, S902, and S1100 performed through the electronic apparatus 1 of the third exemplary embodiment are the same as those performed through the electronic apparatus 1 of the first exemplary embodiment, and thus the operations will be shortly described.

The user may separate the input apparatus 400 from the display apparatus 10 (S100). In the input apparatus 400 separated from the display apparatus 10, the open/close cover 409 has been coupled to the body 401.

The user may set an input mode of the input apparatus 400 (S200).

For example, the user may set the first input mode for inputting information to the first medium where input is performed 40 through the first input unit 410. In this example, the user may separate the open/close cover 409 from the body 401 to input certain information to the first medium where input is performed 40 through the first input unit 410. The open/close cover 409 may be coupled to the one end of the body 401 in which the second input unit 420 is formed to be kept. The pressing of the switch 408 by the open/close cover 409 may be released according to the separation of the open/close cover 409 from the body 401, and the transmitting sensors 412*a* and 412*b* may be activated. However, as described above, the switch 408 will be omitted, and the open/close cover 409 may be formed of a material capable of shielding signals. Accordingly, the display apparatus 10 may receive signals transmitted from the transmitting sensors 412*a* and 412*b* through the separation of the open/close cover 409 from the body 401.

Operations S301 and S401 may be performed, and the user may input information to the first medium where input is performed 40 through the first input unit 410 (S501).

In response to operations S610 to S901 being performed, and the information input being completed, the user may change the input mode of the input apparatus 400 to the second input mode again (S1001). For example, the user may couple the open/close cover 409 to the other end of the body 401 in which the first input unit 410 is formed, and the switch 408 is pressed to inactivate the transmitting sensors 412*a* and 412*b*. Similarly, even in the switch 408 being omitted, the signal transmitted from the transmitting sensors 412*a* and 412*b* may be shielded through the coupling of the open/close cover 409 to the other end of the body 401 in which the first input unit 410 is formed. Accordingly, the writing member 411 may be protected from the outside, and thus endurance of the writing member 411 may be improved.

After the input mode of the input apparatus 400 is changed to the second input mode, the user may couple the input apparatus 400 to the display apparatus 100 (S1100).

In another example, in response to the second input mode which inputs information to the touch screen 12 of the display apparatus 10 using the second input unit 420 of the input apparatus 400 being set by the user, the user may input the information to the touch screen 12 intactly using the input apparatus 400 separated from the display apparatus 10 (S502). The input information may be displayed to the user through the touch screen (S802). In response to the information input being completed (S902), the user may couple the input apparatus 400 to the display apparatus 10 (S1100).

Figure 29:
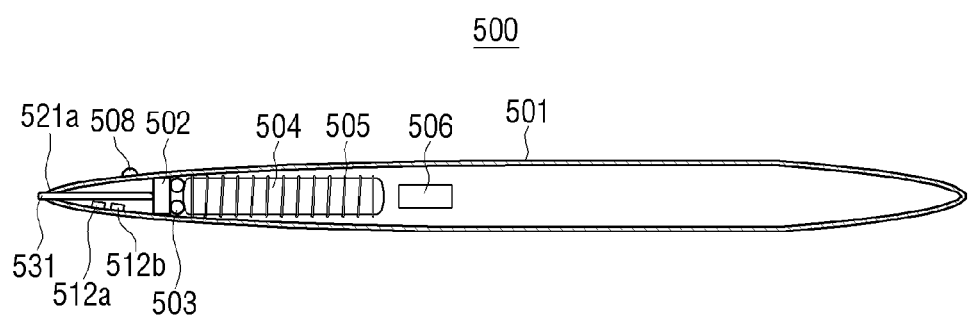
FIG. 29 is a cross-sectional view illustrating an input apparatus of an electronic apparatus according to a fifth exemplary embodiment.

An electronic apparatus 1 according to a fifth exemplary embodiment will be described with reference to FIG. 29. A display apparatus 10 of the electronic apparatus 1 in the fifth exemplary embodiment is the same as the display apparatus 10 of the electronic apparatus 1 in the first exemplary embodiment. Therefore, the same reference numerals as the components of the display apparatus 10 in the first exemplary embodiment are designated to components of the display apparatus 10 in the fifth exemplary embodiment, and detailed description of the display apparatus 10 will be omitted. Only an input apparatus 500 which is different from the input apparatus 100 of the first exemplary embodiment will be described in detail Referring to FIG. 29, the input apparatus 500 according to the fifth exemplary embodiment may include a body 501 and a third input unit 531.

The body 501 may form an outer appearance of the input apparatus 500. Like the input apparatus 100 according to the first exemplary embodiment, the body 501 may include a ferrite chip 502, an O-ring 503, a ferrite core 504, and a coil 505 in an inside thereof so as to input information by touching the touch screen 12 of the display apparatus 10 and detect writing pressure applied to the input apparatus 500. As in the first exemplary embodiment, a battery 506 for driving the input apparatus 500 may be included in the inside of the main body 501.

A hole 521*a* for an input unit to which the third input unit 531 may be slidably coupled may be formed in one end of the body 501. A switch 508 configured to turn on/off transmitting sensors 512*a* and 512*b* may be provided to an outer side of the body 501.

The third input unit 531 may be slidably coupled to a certain length to the hole 521*a* for an input unit formed in the one end of the body 501. Even in the input apparatus 500 according to the fifth exemplary embodiment, writing pressure applied to the input apparatus 500 may be detected through the third input unit 531, and the information may be input to the touch screen 12 through the third input unit 531.

The third input unit 531 may be formed of a material which may not be written in glass but may be written in the first medium where input is performed 40 such as paper. For example, the third input unit 531 may be formed of an ethergraf material. Accordingly, the user may input information to the touch screen 12 using the third input unit 531 or input information to the first medium where input is performed 40 after activating the transmitting sensors 512*a* and 512*b* by turning on the switch 508.

Hereinafter, an operation of the electronic apparatus 1 having the above-described configuration according to the fifth exemplary embodiment will be described with reference to FIG. 11. Among operations illustrated in FIG. 11, operations S200 and S1001 performed through the electronic apparatus 1 of the fifth exemplary embodiment which are different from those performed through the electronic apparatus 1 of the first exemplary embodiment will be described in detail. Operations S100, S301, S401, S501, S502, S601, S701, S801, S802, S901, S902, and S1100 performed through the electronic apparatus 1 of the fifth exemplary embodiment are the same as those performed through the electronic apparatus 1 of the first exemplary embodiment, and thus the operations will be shortly described.

The user may separate the input apparatus 500 from the display apparatus 10 (S100).

The user may set an input mode of the input apparatus 500 (S200).

For example, the user may set the first input mode for inputting information to the first medium where input is performed 40. In this example, the user may press the switch 508 to activate the transmitting sensors 512*a* and 512*b*.

Operations S301 and S401 may be performed, and the user may input information to the medium where input is performed 40 through the third input unit 531 (S501).

In response to operations S610 to S901 being performed, and the information input being completed, the user may change the input mode of the input apparatus 500 to the second input mode again (S1001). For example, the user may press the switch 508 to inactivate the transmitting sensors 512*a* and 512*b*. After the input mode of the input apparatus 500 is changed to the second input mode, the user may couple the input apparatus 500 to the display apparatus 10 (S1100).

In another example, in response to the second input mode of the input apparatus 500 which inputs information to the touch screen 12 of the display apparatus 10 being set by the user, the user may input the information to the touch screen 12 intactly using the input apparatus 500 separated from the display apparatus 10 (S502). The input information may not be written onto the touch screen 12 due to material characteristics of the third input unit 531. The input information may be displayed to the user through the touch screen 12 (S802). In response to the information input being completed (S902), the user may couple the input apparatus 500 to the display apparatus 10 (S1100).

An electronic apparatus 1 according to a sixth exemplary embodiment will be described with reference to FIGS. 30 and 31. A display apparatus 10 of the electronic apparatus 1 in the sixth exemplary embodiment is the same as the display apparatus 10 of the electronic apparatus 1 in the first exemplary embodiment. Therefore, the same reference numerals as the components of the display apparatus 10 in the first exemplary embodiment are designated to the display apparatus 10 in the sixth exemplary embodiment, and detailed description of the display apparatus 10 will be omitted. Only an input apparatus 600 which is different from the input apparatus 100 of the first exemplary embodiment will be described in detail Referring to FIGS. 30 and 31, the input apparatus 600 according to the sixth exemplary embodiment may include a body 601, a first input unit 610, and a second input unit 620.

The body 601 may form an outer appearance of the input apparatus 600, and a hole 601*a* for an input unit may be formed in one end of the body so that the first input unit 610 and the second input unit 620 may protrude to certain lengths. A hole 601*b* for a withdrawal button, into which a withdrawal button 623 configured to withdraw the second input unit 620 to the outside of the body 601 is inserted, may be formed in the other end of the body 601. A hole 601*c* for a first lead-in button and a hole 601*d* for a second lead-in button, into which a lead-in button 624 configured to lead in the second input unit 620 to the inside of the body 601 is inserted, may be formed in an outer side of the body 601. A switch 608 configured to activate the transmitting sensors 612*a* and 612*b* may be provided to the hole 601*d* for a second lead-in button.

A ferrite chip 602*b*, an O-ring 603*b*, a ferrite core 604*b*, and a coil 605*b* for the first input unit 610 may be disposed in the body 601 adjacent to the first input unit 610, and a battery 606*b* may be included in the body 601.

A rib 601*e*, to which an elastic member 31 configured to apply force to lead in the second input unit 620 to the inside of the body 601 may be coupled, may be formed in an inner side of the body 601.

The first input unit 610 may be formed in one end of the body 601, and the first input unit 610 may include a writing member 611 and the transmitting sensors 612*a* and 612*b* to input information to the first medium where input is performed 40. The transmitting sensors 612*a* and 612*b* are the same as those in the above-described exemplary embodiments, and thus detailed description thereof will be omitted.

The wiring member 611 may be provided to be in contact with the ferrite chip 602*b*, and the writing member 611 may be slidably moved to a predetermined length to a longitudinal direction of the body 601 through the hole 601*a* for an input unit and a guide of the second input unit 620 and may detect writing pressure applied to the writing member 611.

The second input unit 620 may include a sub body 621, a tip 622, a withdrawal button 623, and the lead-in button 624 to input information to the touch screen 12. The tip 622 is the same as those in the above-described exemplary embodiments, and thus detailed description thereof will be omitted.

The sub body 621 may be provided to the inside of the body 601, and the sub body 621 may include a ferrite chip 602*a*, an O-ring 603*a*, a ferrite core 604*a*, and a coil 605*a* in an inside of the sub body 621 to input information to the touch screen 12 through the tip 622 and simultaneously detect writing pressure applied to the tip 622.

A fixing rib 621*a* coupled to an elastic member 631 may be formed in an outer side of the sub body 621. For example, the fixing rib 621*a* of the sub body 631 may be coupled to the elastic member 631 which is coupled to the rib 601*e* formed in the inner side of the body 601, and may receive force to a direction to which the second input unit 620 is lead in to the inside of the body 601 from the elastic member 631.

The lead-in button 623 may be provided to a rear end of the sub body 621 so that the lead-in button 623 may be inserted into the hole 601*b* for a withdrawal button formed in the other end of the body 601 to protrude from the body 601 to a certain length. In response to force being applied to the withdrawal button 623 to a direction that the second input unit 620 is withdrawn to the outside of the body 601 by the user, the elastic member 631 is compressed, the lead-in button 624 is moved from the hole 601*d* for a second lead-in button to the hole 601*c* for a first lead-in button, and a portion of the second input unit 620 may be withdrawn to the outside of the body 601.

The lead-in button 624 may be provided to the inside of the body 621 and may be coupled to the withdrawal button 623. The lead-in button 624 may be selectively inserted into the hole 601*c* for a first lead-in button and the hole 601*d* for a second lead-in button. For example, in response to the tip 622 of the second input unit 620 being withdrawn to the outside of the body 601 to a certain length, the lead-in button 624 may be inserted into the hole 601*c* for a first lead-in button and a portion of the lead-in button 624 may be exposed to the outside of the body 601. Force in an opposite direction of force to the right direction in FIG. 30 caused by the elastic member 631 may be applied to a first surface 624*a*. That is, the first surface 624*a* of the lead-in button 624 may be supported by the hole 601*c* for a first lead-in button. In another example, the tip 622 of the second input unit 620 being lead into the inside of the body 601, the lead-in button 624 may be inserted into the hole 601*d* for a second lead-in button and a portion of the lead-in button 624 may be exposed to the outside of the body 601. The first surface 624a of the lead-in button 624 may be inserted into the hole 601d for a second lead-in button, and may press the switch 608 to activate the transmitting sensors 612a and 612b.

The lead-in button 624 may include a supporter 624c coupled to the withdrawal button 623. The supporter 624c may be formed of a material having elasticity. In response to the portion of the lead-in button 624 exposed to the outside of the body 601 being pressed to an inner side direction of the body 601, the lead-in button 624 may be curved to have a certain curvature, and the lead-in button 624 may be slid along the inner side of the body 601 in the inside of the body 601, and moves between the hole 601c for a first lead-in button and the hole 601d for a second lead-in button. In response to the lead-in button 624 being reached between the hole 601c for a first lead-in button and the hole 601d for a second lead-in button, the lead-in button 624 may be inserted into the hole 601c for a first lead-in button or the hole 601d for a second lead-in button by restoring force of the supporter 624c.

Hereinafter, an operation of the electronic apparatus 1 having the above-described configuration according to the sixth exemplary embodiment will be described with reference to FIGS. 11, 32, and 33. Among operations illustrated in FIG. 11, operations S200 and S1001 performed through the electronic apparatus 1 of the sixth exemplary embodiment which are different from those performed through the electronic apparatus 1 of the first exemplary embodiment will be described in detail. Operations S100, S301, S401, S501, S502, S601, S701, S801, S802, S901, S902, and S1100 performed through the electronic apparatus 1 of the sixth exemplary embodiment are the same as those performed through the electronic apparatus 1 of the first exemplary embodiment, and thus the operations will be shortly described.

The user may separate the input apparatus 600 from the display apparatus 10 (S100). One end of the second input unit 620 of the input apparatus 600 separated from the display apparatus 10 may be exposed to the outside of the body 601 to a certain length, and the tip 622 may be exposed to the outside of the body 601.

The user may set an input mode of the input apparatus 600 (S200)

Figure 32:
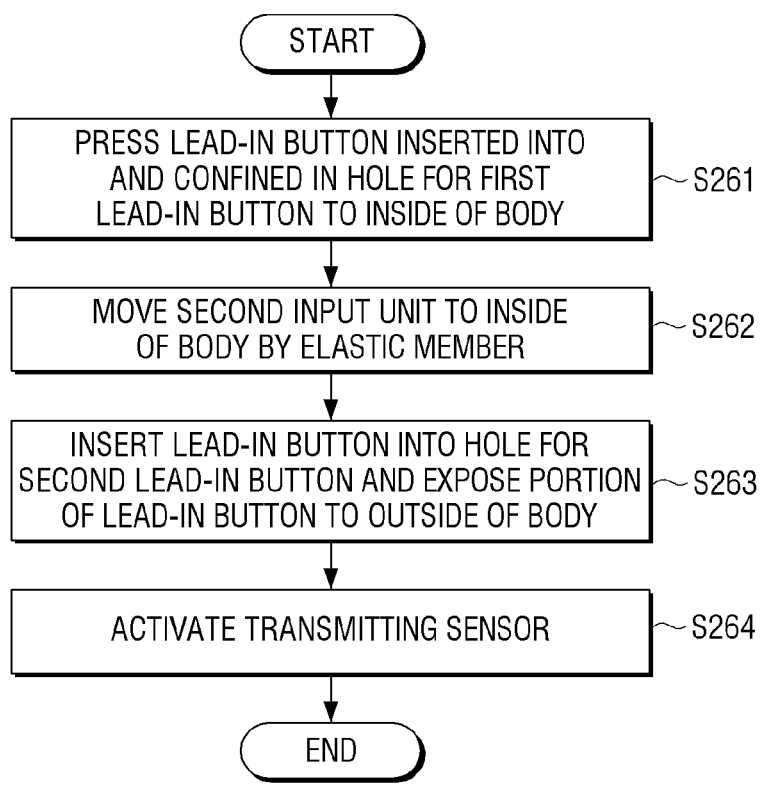
FIG. 32 is a flowchart illustrating a method of setting an input mode in operation S200 of FIG. 11 in the input apparatus according to the sixth exemplary embodiment in detail.

For example, referring to FIG. 32, the user may press the lead-in button 624 which may be inserted into and confined in the hole 601c for a first lead-in button to the inner side of the body 601 (S261). In this example, the lead-inn button 624 may move to the inside of the body 601, and interference applied to the first surface 624a may be released. The second input unit 620 may move to the right direction of FIG. 30 by the elastic member 631, and the tip 622 may move to the inside of the body 601 (S262). According to the movement of the second input unit 620 to the right direction of FIG. 30, while the lead-in button 624 also move to the right direction, the lead-in button 624 may be inserted into the hole 601d for the second lead-in button, and the portion of the lead-in button 624 may be exposed to the outside of the body 601 (S263). In the process, the lead-in button 624 may press the switch 608 to activate the transmitting sensors 612a and 612b (S264).

Operations S301 and S401 may be performed, and the user may input information to the first medium where input is performed 40 through the first input unit 610 (S501).

In response to operations S610 to S901 being performed, and the information input being completed, the user may change the input mode of the input apparatus 600 to the second input mode again (S1001).

Figure 30:
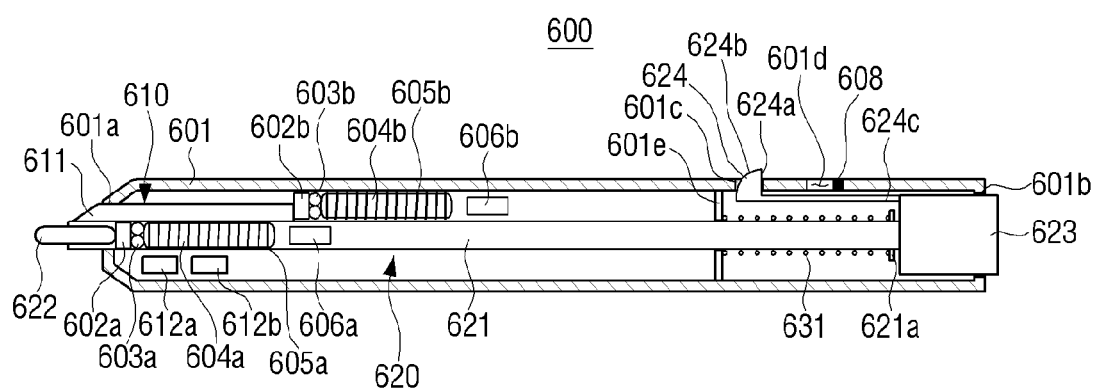
FIGS. 30 and 31 are cross-sectional views illustrating an input apparatus of an electronic apparatus according to a sixth exemplary embodiment.
Figure 31:
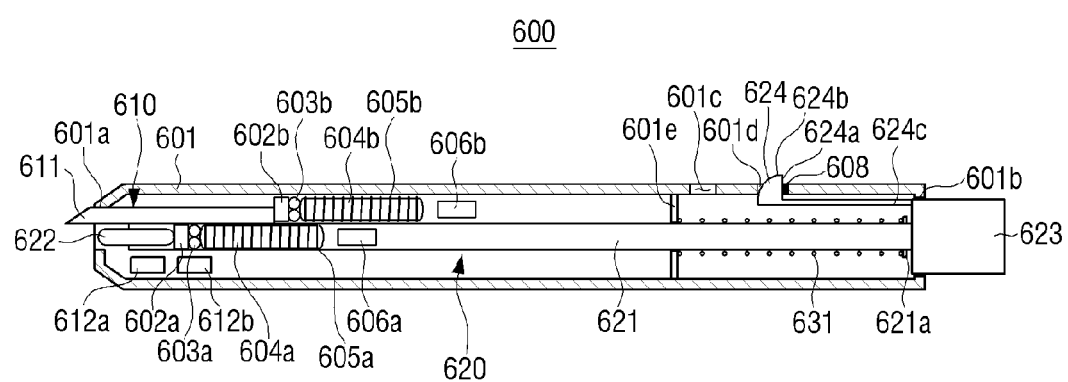
Figure 33:
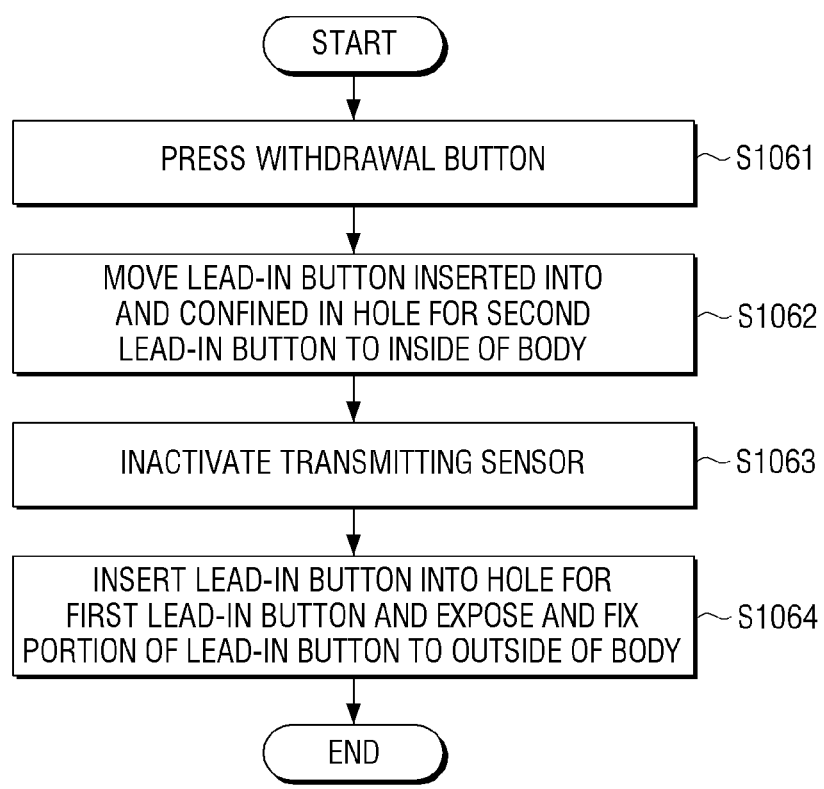
FIG. 33 is a flowchart illustrating a method of changing an input mode in operation S1001 of FIG. 11 in the input apparatus according to the sixth exemplary embodiment.

For example, referring to FIG. 33, the user may press the withdrawal button 623 to the left direction of FIG. 30 (S1061). A second surface 624b of the lead-in button 624 may slide to the hole 601d for a second lead-in button, and the second surface 624b of the lead-in button 624 may move to the left direction of FIG. 30, and simultaneously move to the inside of the body 601 (S1062). Accordingly, the pressure applied to the transmitting sensors 612a and 612b may be released, and the transmitting sensors 612a and 612b may be inactivated (S1063). The lead-in button 624 may be inserted into the hole 601c for a first lead-in button, and the first surface 624a may be supported to the hole 601c for a first lead-in button to be fixed (S1064).

After the input mode of the input apparatus 600 is changed to the second input mode, the user may couple the input apparatus 600 to the display apparatus 10 (S1100).

In another example, in response to the second input mode of the input apparatus 600 which inputs information to the touch screen 12 of the display apparatus 10 using the second input unit 620 being set by the user, the user may input the information to the touch screen 12 intactly using the input apparatus 600 separated from the display apparatus 10 (S502). The input information may be displayed to the user through the touch screen 12 (S802). In response to the information input being completed (S902), the user may couple the input apparatus 600 to the display apparatus 10 (S1100).

As described above, the electronic apparatuses according to exemplary embodiments may input information to a touch screen and a medium where input is performed such as paper through one input apparatus. The conversion of (or switching between) two different input modes included in one input apparatus may be easily performed. The use of the electronic apparatus may be convenient in that the user may confirm the information input to the paper through a display apparatus in real time simply using one input apparatus provided to the electronic apparatus without a separate connection apparatus and a separate input apparatus.

The foregoing exemplary embodiments and advantages are described merely for purposes of example and are not to be construed as limiting the present inventive concept. The exemplary embodiments can be readily applied to other types of devices. Also, the description of the exemplary embodiments is intended to be illustrative only, and not to limit the scope of the claims, and many alternatives, modifications, and variations will be apparent to those skilled in the art.

What is claimed is:

1. An input apparatus, comprising:
   a body;
   a first input device provided to a first end of the body and configured to input information to a first medium; and
   a second input device detachably coupleable to one of the first input device and a second end of the body, the second input device being configured to input information to a second medium,
   wherein transmission of the input information from the first input device to at least one receiving sensor of an electronic apparatus is activated while the second input device is coupled to the second end of the body, and the transmission of the input information from the first input device to the at least one receiving sensor is deactivated while the second input device is coupled to the first input device.

2. The input apparatus as claimed in claim 1, wherein while the second input device is coupled to the second end of the body a first input mode which implements the input information to the first medium is set, and while the second input device is coupled to the first input device a second input mode which implements the input information to the second medium is set.

3. The input apparatus as claimed in claim 1, wherein the first input device includes:
a writing member including an indication medium configured to indicate the input information to the first medium and formed to protrude from the first end of the body; and
at least one transmitting sensor disposed adjacent to the writing member and configured to generate a signal to transmit the input information of the first medium to an electronic apparatus.

4. The input apparatus as claimed in claim 3, wherein the transmitting sensor includes at least one of an ultrasonic transmitting sensor and an infrared transmitting sensor.

5. The input apparatus as claimed in claim 3, comprising:
a switch configured to selectively activate the at least one transmitting sensor provided to the second end of the body, and
the at least one transmitting sensor generates the signal while the second input device is set as an input mode of the input apparatus.

6. The input apparatus as claimed in claim 3, wherein the indication medium includes ink or graphite.

7. The input apparatus as claimed in claim 1, further comprising:
at least one sub input device detachably one of the first input device and the second input device,
wherein the at least one sub input device includes a writing member configured to have an indication medium to indicate the input information to the first medium.

8. The input apparatus as claimed in claim 7, wherein a plurality of sub input units having writing members are provided and the plurality of sub input units include indication mediums having different colors.

9. The input apparatus as claimed in claim 7, comprising:
a plurality of sub input units detachably coupled to each other.

10. The input apparatus as claimed in claim 1, wherein the first medium is paper, and the second medium is a touch screen.

11. The input apparatus as claimed in claim 1, wherein the second input device includes:
a writing member including an indication medium configured to indicate the input information of the second medium, and
the first input device includes at least one transmitting sensor configured to generate a signal to transmit the input information of the second medium to an electronic apparatus according to coupling of the second input device to the first input device.

12. The input apparatus as claimed in claim 11, comprising:
a switch configured to selectively activate the at least one transmitting sensor provided to the first end of the body, and
wherein the at least one transmitting sensor generates the signal while the input mode is set to the first input device.

13. The input apparatus as claimed in claim 11, further comprising:
at least one sub input device detachably coupled to one of the first input device and the second input device,
wherein the at least one sub input device includes a writing member configured to have an indication medium to indicate the input information of the second medium.

14. An electronic apparatus, comprising:
a display apparatus including at least one receiving sensor and a touch screen; and
an input apparatus which is detachably coupled to the display apparatus and includes a body, a first input device provided to a first end of the body and configured to input information to a medium, and a second input device configured to input information to the touch screen,
wherein while the second input device is coupled to a second end of the body, activating the first device to transmit a signal to the at least one receiving sensor, and while the second input device is coupled to the first input device, activating the second input device to transmit a signal to the touch screen.

15. The electronic apparatus as claimed in claim 14, wherein the at least one receiving sensor is provided to a side of the display apparatus.

16. The electronic apparatus as claimed in claim 14, wherein the display apparatus further includes:
a fixing part configured to fix the medium to a side of the display apparatus.

17. A method of controlling an electronic apparatus, the method comprising:
setting an input mode to one of using a first input device of an input apparatus and a second input device of the input apparatus;
inputting information to one of a medium and a touch screen, using the input apparatus; and
displaying one of the input information of the medium and the touch screen,
wherein while the second input device is coupled to an end of a body of the input apparatus opposite an end to which the first input device is coupled, activating the inputting of the information to the electronic apparatus, and while the second input device is coupled to the first input device activating the inputting of the information of to the touch screen.

18. The method as claimed in claim 17, wherein while the coupling of the second input device is to the first input device, the inputting of the information includes inputting the information to the touch screen through the second input device, and
while the coupling of the second input device is to the second end of the body of the input apparatus, the inputting of the information includes inputting the information to the medium through the first input device.

19. The method as claimed in claim 18, wherein while the second input device is coupled to end of the body opposite the end to which the first input device is coupled, the method further comprises:
fixing the medium to the electronic apparatus between the setting of the input mode and the inputting of the information; and
transmitting the input information input of the medium to the electronic apparatus in real time between the inputting of the information and the displaying.

20. The method as claimed in claim 19, further comprising:
setting a writing region in the medium where input is performed through the input apparatus between the fixing and the inputting of the information; and adjusting the transmitted information to a size corresponding to the touch screen between the inputting of the information and the displaying.

21. The input apparatus as claimed in claim 1, wherein the first medium is different than the second medium.

22. The input apparatus as claimed in claim 1, further comprising:
   at least one transmitting sensor configured to generate a signal to transmit the input information of the first medium to the at least one receiving sensor, and
   wherein the coupling position of the second input device one of activates and deactivates the at least one transmitting sensor.

23. A method of controlling information input through an input apparatus, comprising:
   determining whether a first input device configured to input information to a touch screen is activated;
   controlling the input apparatus to input information to the touch screen while the determining indicates the first input device is activated; and
   controlling the input apparatus to switch to using a second input device configured to input information to a medium different from the touch screen and transmit the input information to a receiving sensor while the determining indicates the first input device is deactivated, and the second input device is activated.

24. The method as claimed in claim 23, wherein the first input device is provided at a first end of the input apparatus and the second input device is provided to a second end of the input apparatus.

25. The method as claimed in claim 23, wherein the input apparatus is switched to using the second input device responsive to a user request.

* * * * *